US007862436B2

(12) United States Patent
Cole

(10) Patent No.: US 7,862,436 B2
(45) Date of Patent: Jan. 4, 2011

(54) CUSTOM CONFIGURABLE GAMING MACHINE AND GAMING MACHINE COMPONENTS

(75) Inventor: Joseph W. Cole, North Las Vegas, NV (US)

(73) Assignee: Cole Kepro International, LLC, Las Vegas, NV (US)

( * ) Notice: Subject to any disclaimer, the term of this patent is extended or adjusted under 35 U.S.C. 154(b) by 893 days.

(21) Appl. No.: 11/805,318

(22) Filed: May 22, 2007

(65) Prior Publication Data

US 2007/0225079 A1 Sep. 27, 2007

Related U.S. Application Data

(63) Continuation-in-part of application No. 11/205,839, filed on Aug. 17, 2005, now abandoned.

(60) Provisional application No. 60/615,774, filed on Oct. 4, 2004.

(51) Int. Cl.
*G06F 17/00* (2006.01)

(52) U.S. Cl. .......................................................... 463/47

(58) Field of Classification Search .................. 463/46, 463/47; 361/679.02

See application file for complete search history.

(56) References Cited

U.S. PATENT DOCUMENTS

| | | | | |
|---|---|---|---|---|
| 4,440,457 | A | 4/1984 | Fogelman et al. | |
| 5,813,914 | A | 9/1998 | McKay et al. | |
| 5,951,128 | A * | 9/1999 | Aidone et al. | 312/235.8 |
| 6,545,863 | B2 * | 4/2003 | Huggins | 361/679.58 |
| 6,578,847 | B1 | 6/2003 | Hedrick et al. | |
| 6,702,409 | B2 | 3/2004 | Hedrick et al. | |
| 6,997,810 | B2 | 2/2006 | Cole | |
| 7,130,190 | B1 * | 10/2006 | Baker | 361/695 |
| 2002/0030966 | A1 * | 3/2002 | Huggins | 361/683 |
| 2006/0073900 | A1 | 4/2006 | Cole | |

* cited by examiner

*Primary Examiner*—Ronald Laneau
(74) *Attorney, Agent, or Firm*—Weide & Miller, Ltd.

(57) ABSTRACT

A configurable gaming machine includes a door defining a component area. The component area is configured to accept multiple components, such as displays and player tracking elements, in multiple arrangements, permitting the gaming machine to be constructed in multiple configurations. Other aspects of the invention include an internal component mounting configuration, a door biasing mechanism, a venting configuration, a backlight enclosure, a speaker mount, and a gaming machine stand with integrated footrest.

20 Claims, 11 Drawing Sheets

CUSTOM CONFIGURABLE GAMING MACHINE AND GAMING MACHINE COMPONENTS

RELATED APPLICATION DATA

This application is a continuation-in-part of U.S. patent application Ser. No. 11/205,839, filed Aug. 17, 2005, now abandoned which claims priority to U.S. Provisional Application Ser. No. 60/615,774 filed Oct. 4, 2004.

FIELD OF THE INVENTION

The present invention relates to gaming machines and, more particularly, to a gaming machine components and gaming machines which support multiple configurations.

BACKGROUND OF THE INVENTION

Gaming machines, especially those which are utilized to present wagering type games, have a wide variety of configurations. Currently, such machines are custom configured depending on the particular game or games which the machine is intended to present. For example, the machine may be configured to present a video-type wagering game, such as video poker. In that case, the machine will include a video display. The machine may be configured to present a game of slots and an associated bonus game. In that instance, the gaming machine may include a set of rotatable wheels along with a video display for displaying bonus game information.

In order to accommodate the various differing components for presenting these different games, the gaming machines for presenting those games are custom configured for mounting and containing the components.

In addition, it is generally desirable for gaming machines presenting different games to have different appearances. The difference in appearance is useful in aiding player in identifying particular machines. For example, by providing a gaming machine with a particular appearance, one company may distinguish their machines from another company's machines, enabling players to locate those machines.

Unfortunately, there is substantial cost associated with the development of a gaming machine. Significant resources must be expended to engineer the specific gaming machine configuration. Further, custom tooling and parts may need to be created to manufacture the machine. These and other factors increase the cost of producing gaming machines.

As one attempt to reduce the costs of manufacture and make gaming machines more versatile, the inventor herein invented a gaming machine which may be configured as either a reel-type gaming machine or a video-type gaming machine, as evidenced by U.S. Pat. No. 6,475,087. The present invention further addresses the above-stated problems.

SUMMARY OF THE INVENTION

One aspect of the present invention is a gaming machine which is configured to support a plurality of different configurations. Other aspects of the invention are various features of gaming machines or accessories therefor.

In one embodiment of the invention, a gaming machine includes a housing defining an interior area in which gaming machine components may be located, and a door connected to the housing and moveable between a first position and a second position, the door in the first position generally closing an open portion of a front of the housing and the door in the second position permitting access through the open front portion to the interior area of the housing.

Various embodiments of the invention comprise a gaming machine door which may be arranged to have a variety of configurations and appearances.

In one embodiment, a door defines or comprises a component area which defines an opening and which is configured to accept one or more components of the gaming machine, a console area supporting one or more player input devices, and a lower panel area. In one embodiment, the gaming machine components which are located in the component area of the door are selected from a group including at least one display, a component panel, and a divider. One or more dividers may be used to separate, at least visually, individual components associated with the component area. Various components may be supported by the component panel, such as a media reader, keypad or the like. Preferably, the positions of the components within the component area, as well as their number, may be varied by the manner in which they are mounted to or associated with the door. The door preferably defines an opening at which the components are located, such as by having the display(s) mounted at the opening so as to be viewable by a player of the gaming machine.

In one embodiment, the console area is located below the component area and extends outwardly of a remainder of the door. The console area preferably supports a plurality of input devices such as buttons.

In a preferred embodiment, the lower panel area is defined by a lower panel mounted to the door, the lower panel movable between a closed position over an opening in the door and an open position. One aspect of the invention is a means for biasing the lower panel into its open and closed positions. In a preferred embodiment, this means comprises a piston configured to bias the lower panel towards its open position and at least one spring configured to bias the lower panel towards its closed position.

In one embodiment, the gaming machine housing has a top and a bottom and an opening from the top to the bottom at a front thereof. The door extends from the top to the bottom of the machine for enclosing that opening. The lower panel provides independent access to the interior of the machine through the door.

In accordance with another embodiment of the invention, a door comprises a door frame, a support panel, a bezel, and one or more frame covers. The door frame may have a top, bottom and opposing sides and define a main opening. The support panel spans the sides of the door frame and divides the main opening and door frame into top and bottom portions. The support panel may support a button panel and/or other player input devices or the like.

The bezel is located in the top portion and defines one or more openings for alignment with one or more display devices. The display device(s) may comprise one or more spinning reels or one or more video displays.

The frame covers may include an upper frame cover for location over the top portion of the door frame and a bottom or lower frame cover for location over the bottom portion of the door frame. The door may also include a bumper connected to the support panel.

In one embodiment, the various components of the door are configured to define electrically conductive paths to ground, such as via the door frame.

Another aspect of the invention is an internal component mounting configuration for a gaming machine. In one embodiment, one or more component mounting panels are located inside a housing of a gaming machine for supporting one or more components. Each mounting panel is preferably mounted to an interior of a rear or back portion of the housing, in a vertical orientation. A face of the mounting panel defines a plurality of apertures, permitting a variety of components to be mounted to the panel in various positions or locations.

Another embodiment of the invention is a venting configuration for a gaming machine. A gaming machine includes a light stand which defines one or more vents. The light stand is preferably located at a top portion of the gaming machine and is in communication with an interior of the machine. Heated air from within the machine is permitted to flow upwardly to the light stand, where it exits the machine. In one embodiment, a fan may be used to drive or force air through the machine. One or more inlets may be provided in the gaming machine housing or an associated structure, such as a stand, though which cool air is drawn for replacing the heated air which is expelled.

Another embodiment of the invention is a backlight enclosure for a gaming machine. The backlight enclosure is preferably configured to contain at least one light, such as a flourescent bulb, and be located behind a panel for illuminating the panel. The enclosure is mounted to a support structure in its location behind the panel which is to be illuminated. The enclosure preferably includes at least one access opening, permitting the bulb to be changed without having to disconnect the enclosure from the support structure.

Another embodiment of the invention is a speaker mount for a gaming machine. In one embodiment, one or more speakers are configured for location in the coin tray of a gaming machine. Each speaker includes a housing containing a sound-generating device. The housing is configured to fit within the coin tray. In one embodiment, speakers are located at opposing ends of a coin tray of the gaming machine.

Yet another embodiment of the invention is a gaming machine stand with integrated footrest. The stand preferably has an open front leading to a foot-rest area. The foot-rest area preferably has an upwardly sloping bottom surface. In one embodiment, a gaming machine is configured to rest upon a top surface of the stand over the foot-rest area. Apertures may be provided in the top surface of the stand through which wires may extend from the gaming machine. The stand may define a generally enclosed storage area in which one or more components may be located.

Further objects, features, and advantages of the present invention over the prior art will become apparent from the detailed description of the drawings which follows, when considered with the attached figures.

DETAILED DESCRIPTION OF THE INVENTION

The invention is a gaming machine, the machine including a housing or cabinet permitting multiple configurations of the machine, as well as various other gaming-machine related components and configurations. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
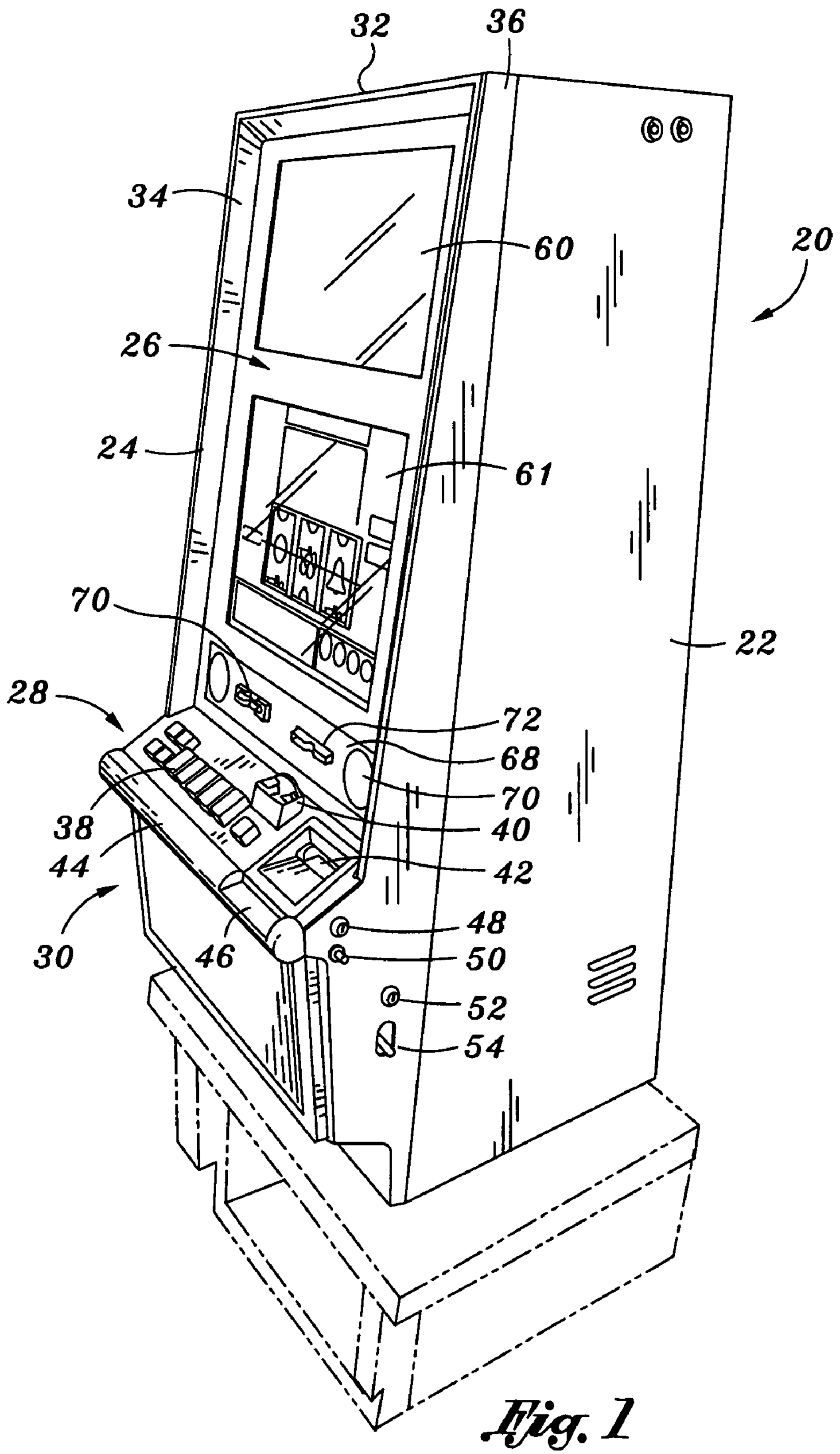
FIG. 1 is a perspective view of an embodiment gaming machine of the present invention arranged into a first configuration.

One embodiment of the invention is a gaming machine permitting multiple configurations. FIG. 1 illustrates one embodiment of such a gaming machine 20 in accordance with the present invention. The gaming machine 20 includes a housing or cabinet 22. The housing or cabinet 22 is configured to support and/or contain one or more gaming machine components.

The housing 22 may have a variety of configurations and be a variety of shapes and sizes. As illustrated, the housing 22 is configured so that the gaming machine 20 has an "upright" configuration. In this configuration, the housing 22 has a top, a bottom, a pair of opposing sides and a back (not visible).

A door 24 is located at a front of the housing 22. The door 24 is movable between a first, open position whereby access is permitted to an interior of the gaming machine 20, and a second, closed position (as illustrated in FIG. 1) in which access to the interior is generally prevented. In the embodiment illustrated, the entire front of the housing 22 is, when the door 24 is in it second position, closed by the door 24. In other embodiments, the door 24 could be smaller than the entire front of the housing 22, such that the door 24 allows access to only a portion of the interior of the housing 22, the remaining front portion of the housing closed by panels, housing wall members or the like.

Various embodiments of the invention comprise a gaming machine door which may be arranged to have a variety of configurations and appearances. One embodiment of a door which may be arranged into a variety of configurations will be described with reference to FIGS. 1-7. Referring to FIG. 1, the door 24 defines a component area 26, a button panel, mount or console area 28, and a lower panel 30. In a preferred embodiment, the component area 26 is positioned above the button panel 28, and the lower panel 30 is positioned below the button panel 28.

As illustrated, the component area 26 is a space between the button panel 28 and a periphery of the door 24, that periphery having a top portion 32 and side portions 34,36. In one embodiment, the component area 26 is generally rectangular in shape, being about twelve to twenty (12-20) inches in width and about twenty-four to thirty-six (24-36) inches in height.

As described in more detail, the component area 26 is configured to accept a plurality of gaming machine components. Preferably, one or more of the components are mounted to the door 24, and face outwardly towards a player of the game. The components may include, but are not limited to, displays such as LCD, LED, CRT, plasma, DLP and others, keypads, media printers (such as ticket printers and bar code printers) and readers (such as bill validators, ticket readers, smart card and magnetic stripe card readers), speakers and other devices.

Preferably, the button panel 28 comprises an outwardly extending support portion of the door 24. As illustrated, the button panel 28 includes an outwardly extending, somewhat downwardly sloping support surface. Preferably, one or more components of the gaming machine 20 are supported or associated with the button panel 28. In one embodiment, these components include one or more buttons 38 or other devices for accepting player input, a coin acceptor 40 and a media reader 42 (such as a bill validator). Other or additional components may be provided. In particular, as detailed below, the components which are associated with the button panel 28 may vary depending upon the components which are located elsewhere on the machine and the desired configuration of the machine, among other factors.

In one embodiment, a bumper or cushion 44 is provided at front edge of the button panel 28. Preferably, the bumper 44 comprises a cushioned or somewhat compressible member. In one embodiment the bumper 44 may be constructed of a foam material covered by a protective coating or cover.

In a preferred embodiment, the bumper 44 extends from one side of the button panel 28 to the other, thus providing a cushion at the front or outer-most extending portion of the button panel 28. As illustrated, a cut-out or trough area 46 may be provided in the bumper 44 in order to facilitate access to the media reader 42. As illustrated, this cut-out or depression 46 is located in a top portion of the bumper 44 in alignment with a guideway portion of the media reader 42.

The lower panel 30 preferably covers one or more gaming machine 20 components located there behind, such as within the housing 22 of the gaming machine 20. Greater details of the panel 30 are provided below.

In one embodiment, the lower panel 30 may include a latching and/or locking mechanism which controls movement of the panel 30 between an open and closed position. In one embodiment, a locking mechanism includes a key-actuated lock 48. A latching mechanism includes a movable lever 50. In a preferred configuration, the movement of the lever 50 may be utilized to unlatch the panel 30, permitting its movement from a closed to an open position. Preferably, movement of the lever 50 is controlled by the lock 48. When the lock 48 is locked, then the lever 50 can not be actuated and the panel 30 can not be opened. As illustrated the lock 48 and lever 50 are preferably mounted to the door 24.

Movement of the door 24 from the closed to the open position may be similarly controlled. As illustrated, a door lock 52 and lever 54 are preferably mounted to the housing 22.

Advantageously, the gaming machine 20 of the invention may be assembled so that the gaming machine 20 has a variety of different configurations. Preferably, the gaming machine 20 may also be converted between a first and at least one second (or other) configuration. In this manner, the gaming machine 20 may be custom configured to include specific desired components and to have a specific desired appearance, from among many different possible combinations of components and many possible different possible appearances.

In a preferred embodiment, the ability to configure or convert the gaming machine 20 is facilitated by the ability to arrange components relative to the door 24, such as within the component area 26. In addition, however, other components may be associated with the button panel 28. As described herein, the configuration of the door of a gaming machine may be changed, including the appearance thereof (such as the shape, superficial effects or the like), the components associated therewith (such as displays, dividers, or the like), or the components with which the door 24 is associated or cooperates (such as displays mounted to the gaming machine housing which the door closes over).

FIG. 1 illustrates one example configuration of the gaming machine 20. As illustrated, in this embodiment, two displays 60,61 are located in the component area 26, as well as a component bar or panel 68. In the embodiment illustrated, the component bar or panel 68 supports components of a player tracking device, including speakers 70, a media reader 72 (such as a magnetic stripe card reader) and a media printer 74 (such as ticket printer). Additional details of configurations of the gaming machine and the construction of the gaming machine are provided below.

FIGS. 2-7 illustrate additional example configurations of a gaming machine 20 in accordance with the present invention. It will be appreciated that these figures illustrate just a few of the possible configurations for the gaming machine.

Figure 2:
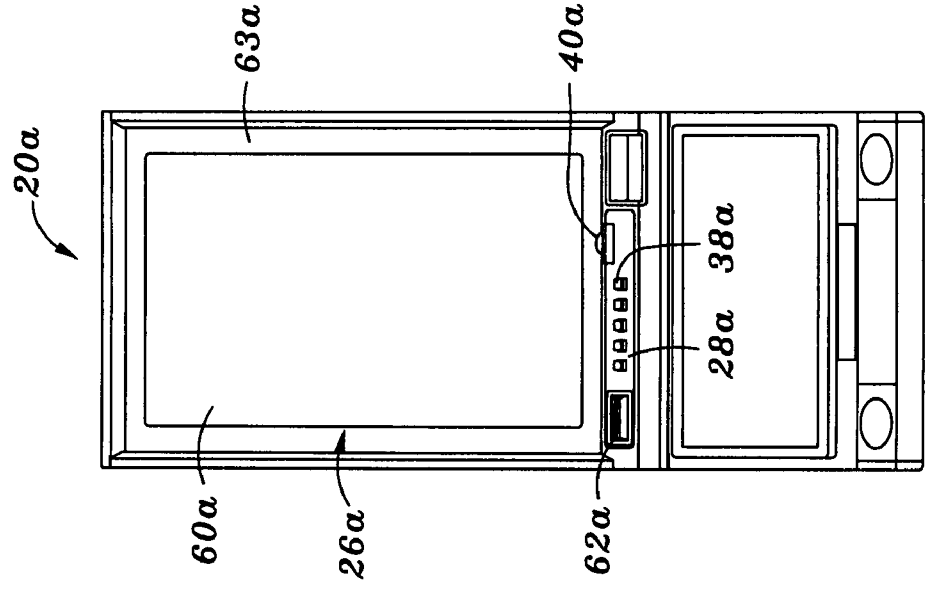
FIG. 2 is a perspective view of an embodiment gaming machine of the present invention arranged into a second configuration.

FIG. 2 illustrates an embodiment of a gaming machine 20*a* in which a single display 60*a* is located in the component area 26*a* and is configured to present game and other information to a player/user of the machine 20*a*. In one embodiment, the display 60*a* is a thirty (30) inch LCD display, which display occupies substantially all of the component area 26*a*.

In a preferred embodiment, the button panel 28*a* of this machine supports a plurality of input buttons 38*a*, a media reader 62*a* (such as a magnetic stripe card reader or smart card reader), and a coin acceptor 40*a*. Of course, the button panel 28*a* might support other components.

Figure 3:
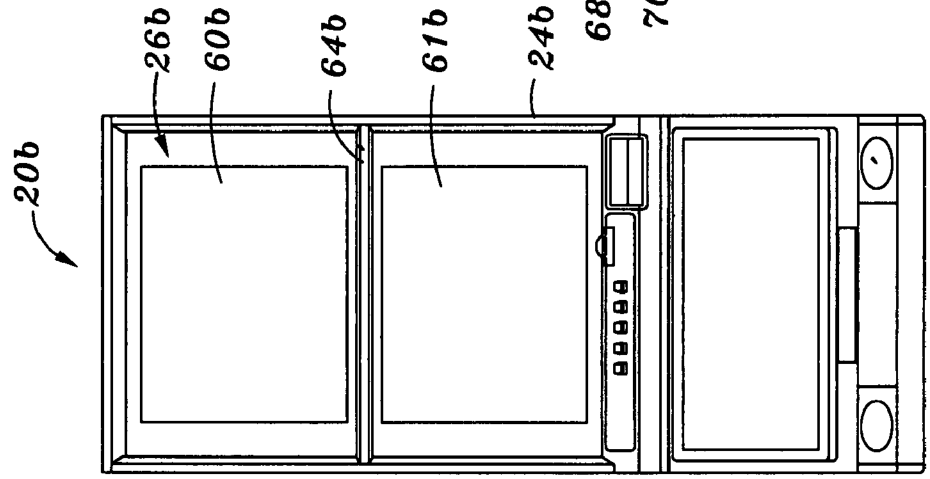
FIG. 3 is a perspective view of an embodiment gaming machine of the present invention arranged into a third configuration.

FIG. 3 illustrates yet another configuration of a gaming machine 20*b* in accordance with the invention. In this embodiment, a first display 60*b* and a second display 61*b* are located in the component area 26*b*. In this embodiment, the first and second displays 60*b*,61*b* are generally of the same size, such as nineteen (19) inch LCD panels.

Preferably, the displays 60*b*,61*b* are separated by a divider 64*b*. In one embodiment, the divider 64*b* is a raised bar which extends between the opposing sides of the periphery of the door. The periphery of the door may comprise a raised beveled member which extends outwardly to "frame" the component area 24*b*. The divider 64*b* maybe similarly configured, so as to have the same appearance. In a preferred embodiment, the divider 64*b* is selectively connectable to the door 24*b*. In this manner, the position of the divider 64*b* may be changed. However, because the divider 64*b* has the same appearance as the peripheral portion of the door 24*b*, the divider 64*b* makes it appear that the door is actually constructed to have two different areas, one for each display.

Of course other divider configuration may be provided. In one embodiment, the divider may be mounted from inside the door and be a bar or other member extending across the opening comprising the component area. Preferably, the divider or dividers may be mounted to the door in a variety of locations to facilitate the multiple configurations of the gaming machine. In one embodiment, mounting brackets supporting multiple divider mounting positions may be provided.

This configuration gaming machine 20*b* has particular utility in the situation where two different games are to be presented to a player. The gaming machine 20*b* may, however, be configured to present a wide variety of information on either or both displays 60*b*,61*b*.

Figure 4:
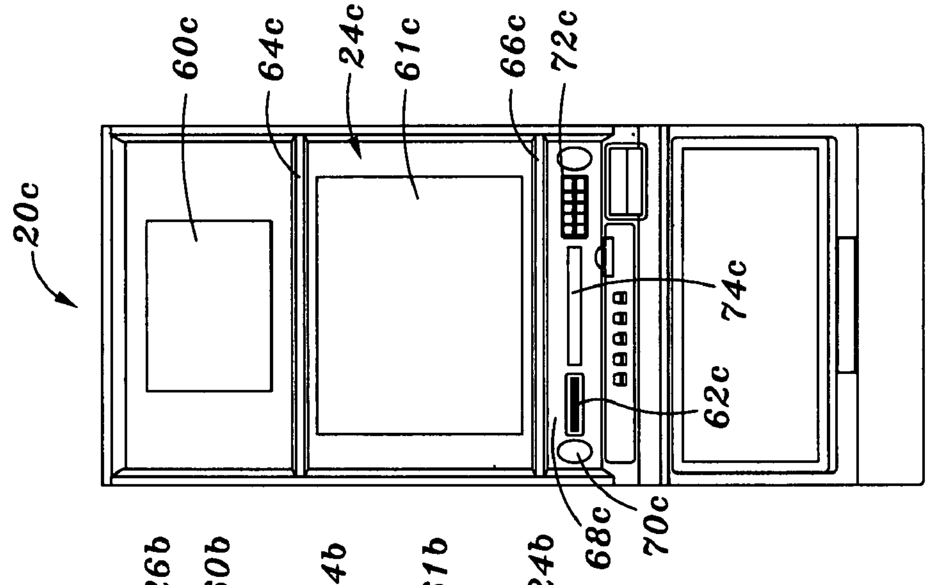
FIG. 4 is a perspective view of an embodiment gaming machine of the present invention arranged into a fourth configuration.

FIG. 4 illustrates yet another configuration of a gaming machine 20*c* in accordance with the invention. In this configuration, the gaming machine 20*c* again includes a first display 60*c* and a second display 61*c* located in the component area 24*c*. The size and configuration of these displays 60*c*,61*c* may vary. As illustrated, the first display 60*c* is smaller than the second. For example, the first display 60*c* may be a twelve (12) inch LCD panel and the second display 61*c* may be an eighteen (18) inch LCD panel. Of course, the displays may be of a variety of shapes and/or sizes.

In this embodiment, a component panel 68*c* is also located in the component area 24*c*. The component panel 68*c* supports and presents one or more components. As illustrated, the component bar or panel 68*c* is supporting one or more speakers 70*c*, a media reader 62*c*, a keypad 72*c*, and small display 74*c*.

In a preferred embodiment, the displays 60*c*,61*c* are separated from one another by a first divider 64*c*, and the component panel 68*c* is separated from the displays 60*c*,61*c* by a second divider 66*c*.

Figure 5:
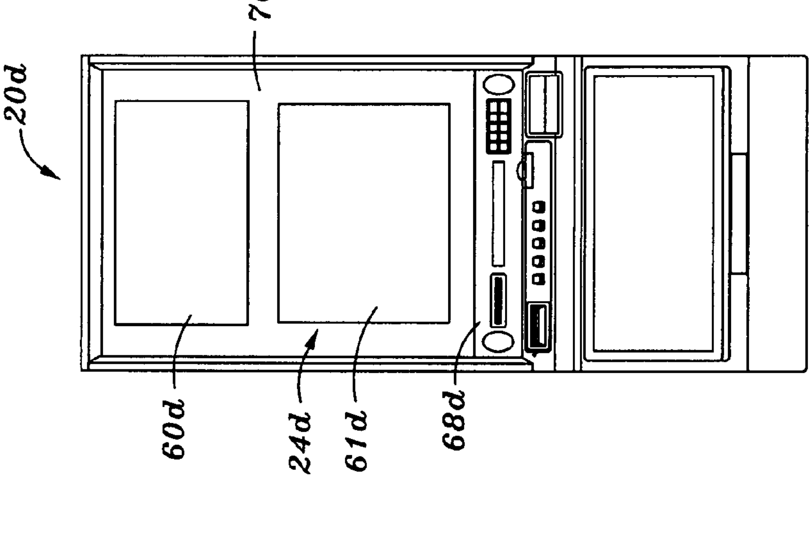
FIG. 5 is a perspective view of an embodiment gaming machine of the present invention arranged into a fifth configuration.

Yet another embodiment of a gaming machine 60*d* is illustrated in FIG. 5. This embodiment machine 20*d* is similar to that illustrated in FIG. 4, except that the displays 60*d*,61*d* and component panel 68*c* are not separated from one another by dividers. Instead, the displays 60*d*,61*d* are surrounded by a bezel 76*d*. The bezel 76*d* preferably separates the displays 60*d*,61*d* and component panel 68*d* from one another visually.

Figure 6:
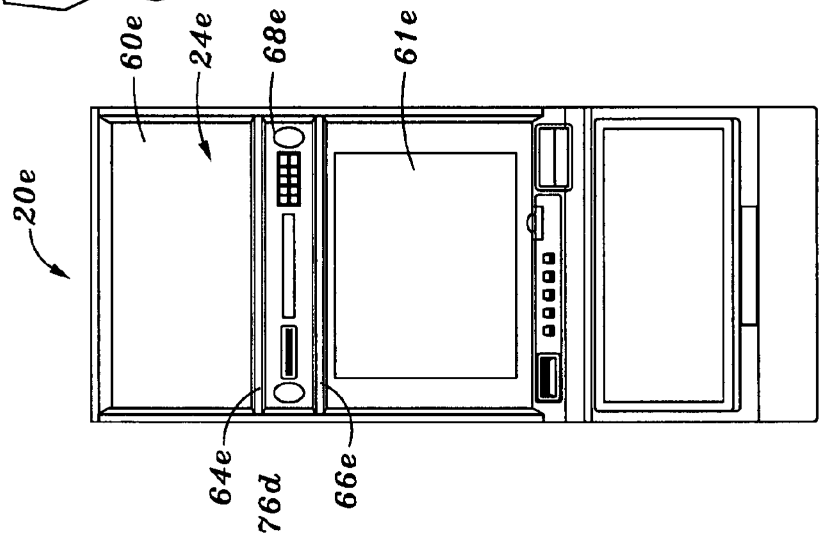
FIG. 6 is a perspective view of an embodiment gaming machine of the present invention arranged into a sixth configuration.

Yet another embodiment gaming machine 20*e* is illustrated in FIG. 6. In this embodiment, the component area 24*e* includes a first display 60*e*, a component bar or panel 68*e*, and then a second display 61*e*. These components are again preferably separated by dividers 64*e*,66*e*.

Figure 7:
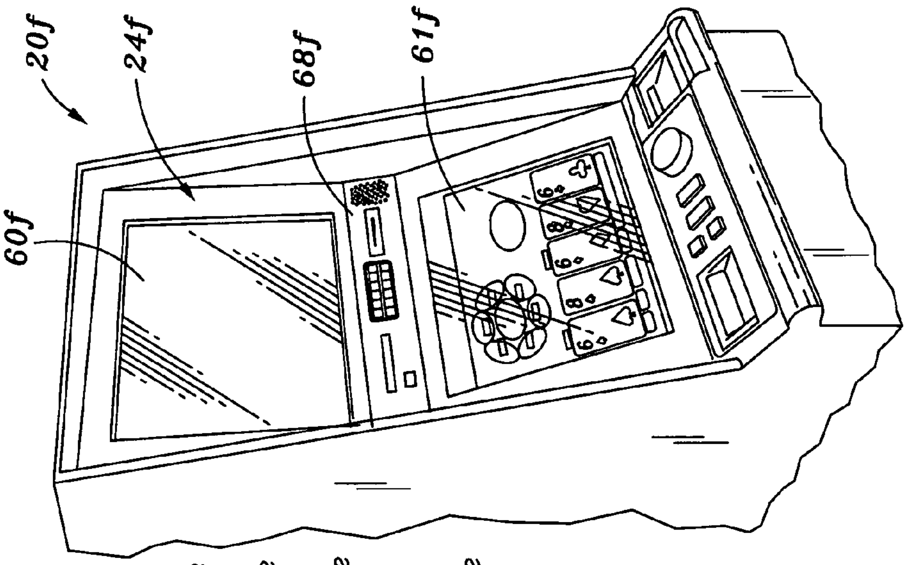
FIG. 7 is a perspective view of an embodiment gaming machine of the present invention arranged into a seventh configuration.

Another embodiment gaming machine 20*f* is illustrated in FIG. 7. This embodiment gaming machine 20*f* is similar to that illustrated in FIG. 6. In particular, a component area 24*f* thereof includes first and second displays 60*f*,61*f* separated by a component bar or panel 68*f*. In the illustrated configuration, one or more brackets are utilized to connect the displays to the machine 20*f* in a manner by which they are tilted or angled. In one embodiment, as illustrated in FIGS. 1-6, the displays may be mounted so that they are generally vertically extending. As illustrated in FIG. 7, the displays may also be mounted so that are located in one or more planes which are offset from vertical.

In one embodiment, as illustrated in FIG. 7, a first or top display 60*f* may be mounted so as to tilt forward or downwardly towards the eyes of a player which are normally located below the height or level of the display. The second or bottom display 61*f* may be mounted so as to tilt backwardly or upwardly towards the eyes of a player which may be located at or above the height of this display. In this manner, the displays 60*f*,61*f* lie in planes which intersect at a point behind them. The displays 60*f*,61*f* could be mounted in other planes. The particular mounting illustrated is advantageous where the machine is to be situated such that the player's level line of sight is directed to a point generally between the displays 60*f*,61*f*, so that when the player is looking down towards the lower display 61*f*, that display is tilted up towards the player and so that when the player is looking up towards the top display 60*f*, that display is tilted down towards the player.

As described, the displays 60*f*,61*f* may be mounted to a door of the gaming machine 20*f* with one or more brackets into the illustrated position. In one embodiment, the component bar 68*f* is still mounted so as to be generally vertically extending.

Once again, it is emphasized that the embodiments of the gaming machine illustrated in FIGS. 1-7 are examples of various configurations of the gaming machine permitted in accordance with the invention. Many other configurations are permitted. For example, in one embodiment, the display may comprise a static graphical display panel, such as a painted glass panel. Such a panel, which is often back-lit, may be located in a first portion of the component area and one or more electronic displays may be located at other portions of the component area.

Additional details of the gaming machine 20 will now be described with reference again to FIGS. 1-7. As indicated, one or more displays and other components may be associated with the component area 26 of the gaming machine 20.

In a preferred embodiment, components such as the displays, component panels and the like are mounted to the door 24. In one embodiment, the component area 26 comprises a display window or opening, that window or opening framed by the door. The displays and other components are preferably connected to the door so as to be viewable through the opening in the door. The components could also be located at the front of the door for access/viewing. In such a configuration, the components need not be aligned with an opening in the door.

One embodiment of a mounting configuration for a display, such as an LCD panel, is detailed in U.S. Pat. No. 6,860,814 which is incorporated by reference in its entirety herein. As disclosed therein, such panels may be mounted to a rear of the door 24 so as to be visible through the opening comprising the component area 26.

In one embodiment, glass or a similar suitable covering may be located over the displays for protecting the surfaces of the displays. For example, in the embodiment gaming machine 20*a* illustrated in FIG. 2, the entire opening or area defined by the component area 26 may be filled or covered with glass or other transparent protective member. In the example illustrated in FIG. 4, glass may cover the displays 60*c*,61*c*, but not the component panel 68*c*.

As indicated, a bezel may be located around the display or displays or other components, for setting those components off from one another visually. For example, the display 60*a* of the gaming machine 20*a* illustrated in FIG. 2 may have a bezel 63*a* around its periphery. The bezel 63*a* may comprise a printed portion of the covering glass, such as a black painted border, or may comprise a physical element such as a frame element. The frame element may be mounted to the door 24*a* or the like, such as in front of the display 60*a* and/or glass or other covering over the display.

In the case of the gaming machine 20*b* illustrated in FIG. 3, there may be more than one bezel, or there may be a single bezel, with the divider 64*b* extending over the bezel.

It will be appreciated that the configuration of elements associated with the button panel 28 may vary, including as dependent upon what components are located in the component area 26. For example, if a media reader, such as magnetic-stripe card reader or smart card reader, is located in the component area (such as associated with a component panel, as illustrated in FIG. 4), then that component may not need to be located at the button panel 28 or elsewhere on the machine.

As indicated, the gaming machine may be configured to support other components. For example, the gaming machine might be configured as a reel-type machine and include one or more reels which are mounted for display in the component area (such as mounted to the door or there behind for viewing through the opening).

Advantageously, this aspect of the invention provides a "generic" gaming machine structure which allows for multiple component configurations, thus allowing the gaming machine to be "customized." The embodiment gaming machine thus substantially reduces the cost associated with production of gaming machines having a variety of different configurations. At the same time, the gaming machine supports a nearly limitless number of configurations. This allows production of various gaming machines which have unique appearances.

The number of appearances of the gaming machine may be further enhanced with superficial effects. For example, the door perimeter, dividers and the like may be chrome or gold plated or otherwise colored in a various shades, and the lower panel may include various graphics, among other things. This further enhances the ability to make the gaming machine distinct in appearance. For example, various configurations of the gaming machine may be developed for "themed" games, and the graphics and the like may be provided to match and promote that theme.

Another embodiment of the invention will be described with reference to FIGS. 8-12. These figures show additional embodiments of the invention wherein the configuration of a gaming machine door and/or the components associated there with, may be changed.

Figure 8:
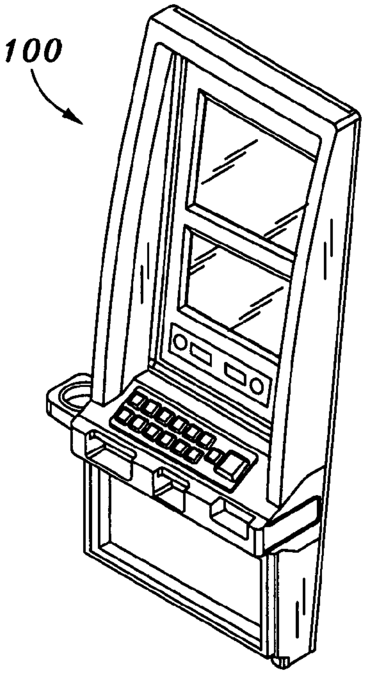
FIG. 8 is a perspective view of a gaming machine door assembly in accordance with another embodiment of the invention.
Figure 9:
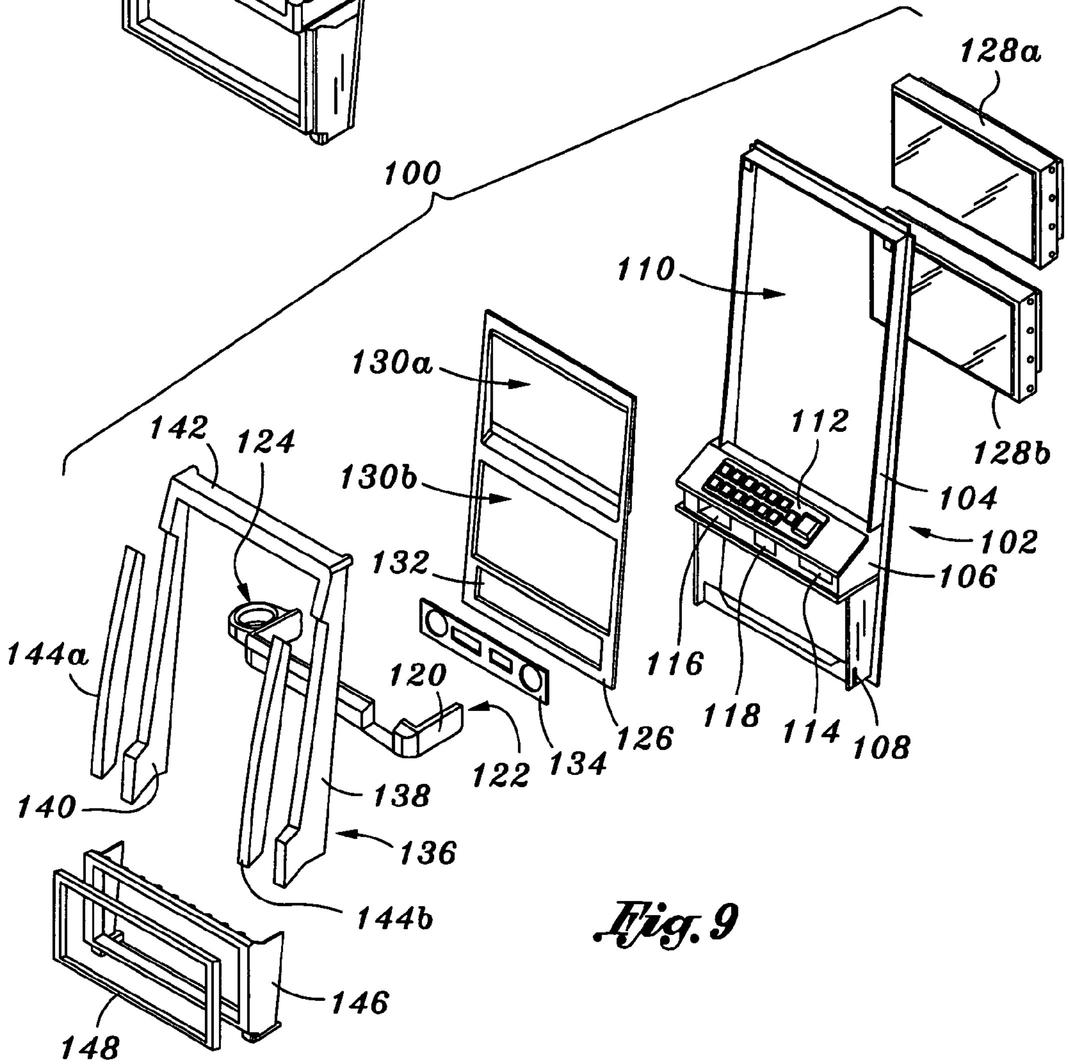
FIG. 9 is an exploded view of the door assembly illustrated in FIG. 8.

FIG. 8 illustrates a gaming machine door or door assembly 100 in accordance with another embodiment of the invention. The configuration of the door 100 will be described with reference to FIG. 9, which shows the door in exploded view. In one embodiment, the door 100 is constructed from a number of components, the configurations of which allow the configuration or appearance of the door 100 to be varied.

As illustrated, the door 100 includes a door frame 102. In one embodiment, the door frame 102 comprises a support structure for one or more other components. The door frame 102 may be constructed from plastic or other material. In one embodiment, the door frame 102 is preferably configured to conduct electricity and be sufficiently strong and rigid to support components, and therefor may be constructed of metal.

In one embodiment, the door frame 102 preferably comprise or defines a periphery of the door, namely a pair of sides and a top and bottom thereof. The frame 102 extends around or defines a main or central opening. The door frame 102 generally has a front and a rear, corresponding to the position of the door when connecting to a housing of a gaming machine.

In one embodiment, the door 100 includes a support panel 106. The support panel 106 preferably extends between the opposing sides of the door frame 102 and divides the door frame 102, including the main opening, into a top or upper portion 104 and a bottom or lower portion 108. It will be appreciated that the position that the support panel 106 is connected to the door frame 102 generally determines the relative sizes of the upper and lower portions 104, 108. Thus, by changing or adjusting the position of the support panel 106, the appearance of the door 100, and thus a gaming machine with which the door is associated, may be varied.

The shapes and sizes of these various portions of the door frame 102 may vary, including based upon the desired configuration of the gaming machine. In one embodiment, the top portion 104 and bottom portion 108 are configured to accept one or more components or other elements therein. In this regard, the top portion 104 defines a component area 110.

The support panel 106 comprises a support for various components of the gaming machine. In one embodiment, the support panel 106 extends the width of the door and outwardly thereof, such as for supporting one or more buttons. In one embodiment, a button panel 112 which includes or supports one or more buttons or player input devices is mounted to the support panel 106. In other embodiments, the buttons or other input devices could be mounted directly to the support panel 106.

The button panel 112 may have a variety of configurations. In a preferred embodiment, the button panel 112 is configured to be electrically conductive and is connected to the door frame 102 in a manner providing an electrically conductive path there between.

In one embodiment, one or more components may be associated with a gaming machine so as to be located behind the support panel 106 when the door 100 is in a closed position. Alternatively, or in addition, one or more components might be mounted directly to the door 100. For example, a bill or currency validator might be mounted to the door 100. In one embodiment, the support panel 106 may define an opening 114 there through in alignment with an opening of the bill validator. The support panel 106 might similarly define an opening 116 corresponding to a card reader and an opening 118 corresponding to a ticket printer. Of course, the specific configuration of the support panel 106 might vary depending upon the variety of components which the gaming machine includes.

In one embodiment, the door assembly 100 may include a bumper 120. The bumper 120 may be configured to be located at the periphery of the support panel 106. In one embodiment, the support panel 106 may define a recessed area for accepting a portion of the bumper 120. The bumper 120 may comprise a cushioned or otherwise energy absorbing or soft member. In one embodiment, the bumper 120 may be molded.

As illustrated, the bumper 120 has a middle portion and opposing first end 122 and second ends 124. The first and second ends 122,124 extend generally perpendicular to the middle portion. As illustrated in FIG. 8, when mounted to the support panel 106, the bumper 120 is preferably located at a front or forward position of the support panel 106. In one embodiment, the first and second ends 122,124 thereof extend around the sides of the support panel 106.

The configuration of the bumper 120 may vary. In one embodiment, as illustrated, a cup holder is located at the second end 124 thereof. Of course, the bumper 120 need not include a cup holder or it might include more than one cup holder. As also illustrated, the bumper 120 may define one or more cut-outs or similar areas for alignment with one or more of the openings in the support panel 106.

In a preferred embodiment, the bumper 120 is selectively connectable to the support panel 106. In this manner, bumpers of different color, shape or the like may be associated with the frame 102 in a manner allowing the configuration of the door assembly 100 to be varied.

In one embodiment, one or more display devices may be associated with the door. In one embodiment, the one or more display devices may be directly mounted to the door frame 102. In other embodiments, the door could be configured to simply be associated with such devices, such as by having those devices mount to a gaming cabinet with which the door is associated and the door being located adjacent thereto when the door is in a closed position.

The display devices may vary, such as depending upon the configuration of the gaming machine. For example, the display devices may comprise video displays such as plasma, LCD, LED, CRT or the like, or one or more spinning or rotating reels, wheels or other devices.

In one embodiment, the door assembly 100 includes a bezel 126. The bezel 126 is preferably selectively connectable to the door frame 102. The bezel 126 may be associated with the top portion 104 of the frame 102, so as to be located in the component area 110.

The particular shape and size of the bezel 126 may vary, including depending upon the desired appearance of the door assembly 100 and the particular components with which the bezel is to be associated. In one embodiment, the bezel 126 defines at least one opening through which a display device may be viewed at one or more times. In the example illustrated in FIGS. 8 and 9, the bezel 126 is configured to be associated with two video displays 128*a*, 128*b*. As such, the bezel 126 comprise a frame which defines two display openings 130*a*,130*b*. In one embodiment, the openings 130*a*,130*b* are located one above the other. In this configuration, the first and second displays 128*a*,128*b* are configured to be viewed through the openings 130*a*,130*b* of the bezel 126.

In a preferred embodiment, the displays 128*a*,128*b* may be mounted to the door frame 102 so as to be part of the door assembly 100. In this configuration, the displays 128*a*,128*b* may move with the door when it is opened and closed relative to a gaming machine.

Figure 10:
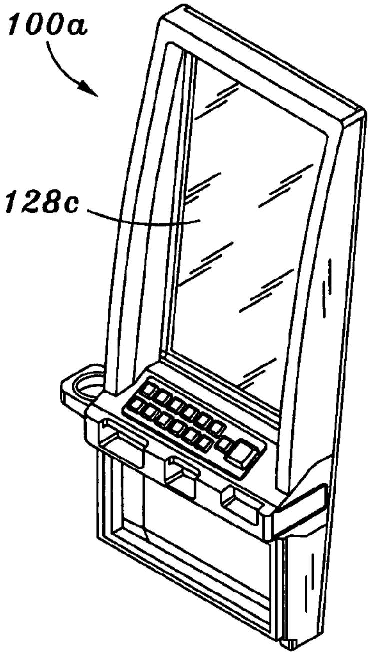
FIG. 10 is a perspective view of a gaming machine door assembly configured in accordance with another embodiment of the invention.

It will be appreciated that the configuration of the bezel 126 may vary depending upon the desired configuration of the door assembly 100. For example, the bezel 126 may define only a single display opening or it might define more than two openings. FIG. 10, for example, illustrates a door assembly 100*a* in which the bezel defines a single opening for viewing of a single display 128*c* there through. As illustrated, this particular door assembly 100*a* has a different appearance and different configuration (utilizing a single display in a "portrait" configuration rather than one or more displays in "landscape" configuration).

Referring again to FIG. 9, the bezel 126 may define other openings. For example, the bezel 126 may define a component opening or area 132. One or more components may be configured to align with or be located in this opening. For example, a component panel 134 may be located in this area. The component panel 134 may be configured to cooperate with or have associated therewith, one or more components. Such components might comprise one or more speakers, one or more displays, a card or other media reader and/or other devices.

In the configuration illustrated, the component panel 134 is located below the display openings 130*a*,130*b*. However, the bezel 126 could have a variety of other configurations, such as where the component panel 134 is located between or above those openings.

In a preferred embodiment, the bezel 126 is constructed of metal or other electrically conducting material. Further, the bezel 126 is preferably connected to the door frame 102 so that an electrically conductive path is provided there between. The bezel 126 could be constructed of other materials, however.

In one embodiment, the door assembly 100 includes an upper frame cover 136. Preferably, the upper frame cover 106 is located over a front portion of the door frame 102, thus covering or enclosing that portion of the door frame 102.

In order to permit the appearance of the door assembly 100 to be varied/customized, the configuration and/or appearance of the upper frame cover 136 may vary. In one embodiment, the upper frame cover 136 is configured to extend around the top portion 104 of the door frame 102. The upper frame cover 136 thus includes a first leg 138, a second leg 140 and a top portion 142, corresponding to the same portions of the top portion 104 of the door frame 102.

The upper frame cover 136 may be configured to be removably attached to the door frame 102, such as by being press-fit into engagement therewith, or by being configured to attach thereto with one or more fasteners (such as tabs which extend therefrom into mating holes or slots in the door frame, or with screws or the like).

The upper frame cover 136 may be constructed from a variety of materials. For example, the upper frame cover 136 may be constructed of plastic, such as in a molding process. Preferably, the upper frame cover 136 is configured to define an electrically conductive pathway from an exterior thereof to the door frame 102. In one embodiment, at least a portion of the upper frame cover 136 may be plated with metal or another conductive material. In other embodiments, conductive pathways may be defined through the upper frame cover 136 (such as by embedding conductive particles or material therein).

The upper frame cover 136 may have a variety of shapes and exterior treatments, such as colors. In one embodiment, the upper frame cover 136 may be constructed from more than one element, or have other elements associated therewith. As illustrated, inserts 144*a*,144*b* may be connected to each leg 138,140 of the upper frame cover 136. In this manner, the upper frame cover 136 may be configured to have one appearance without the inserts 144*a*,144*b* and may have a variety of other configurations depending upon the inserts 144*a*,144*b* associated therewith. The shape and size of the inserts 144*a*,144*b* may vary.

In one embodiment, one or more components or elements may be associated with the bottom or lower portion 108 of the door frame 102. In one embodiment, the lower portion 108 of the door frame 102 may be utilized as a display area. One or more electronic or other displays, such as back-illuminated glass or other signage, may be located in this area. Such displays or signage may be supported by the door frame 102. In other embodiments, the door assembly 100 could be configured to cooperate with such elements (such as by being closed over those elements).

In one embodiment, the door assembly 100 includes a lower frame cover 146. Preferably, the lower frame cover 146 is mounted over a portion of the front of the door frame 102 to cover the door frame. The lower frame cover 146 may be similar to the upper frame cover 136, except configured to be located at the lower portion 108 of the door frame 102. As with the upper frame cover 138, the configuration of the lower frame cover 146 may be varied in order to change the appearance thereof. For example, the shape and/or color or texture thereof may be varied.

As illustrated, a bezel or trim element 148 may be connected to the lower frame cover 146. This element 148 might be chrome or have other appearances.

FIG. 8 shows the door assembly 100 as configured in accordance with one embodiment of the invention. As illustrated, this configuration includes two video displays. FIG. 10 illustrates another configuration door assembly 100*a* including only a single video display. As indicated above, however, the principles of the invention may be applied so as to generate door assemblies having a wide variety of appearances.

Figure 12:
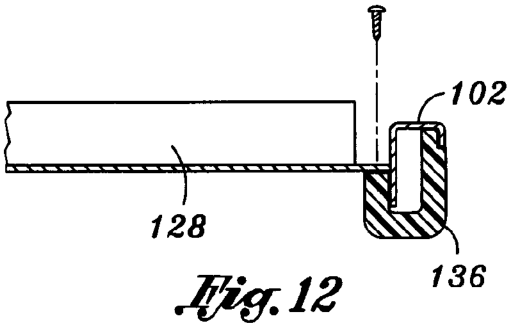
FIG. 12 illustrates a display mounting configuration in accordance with the present invention.

As indicated above, in one embodiment, one or more displays may be mounted to the door frame 102. FIG. 12 illustrates one embodiment of a display mounting arrangement. As illustrated, the video display 128 mounts to the upper frame cover 136. For example, the upper frame cover 136 may be mounted to the door frame 102 and have a portion or face which extends into the component area defined by the door frame 102. The display 128 may mount to this face or portion of the upper frame cover 136.

Figure 11:
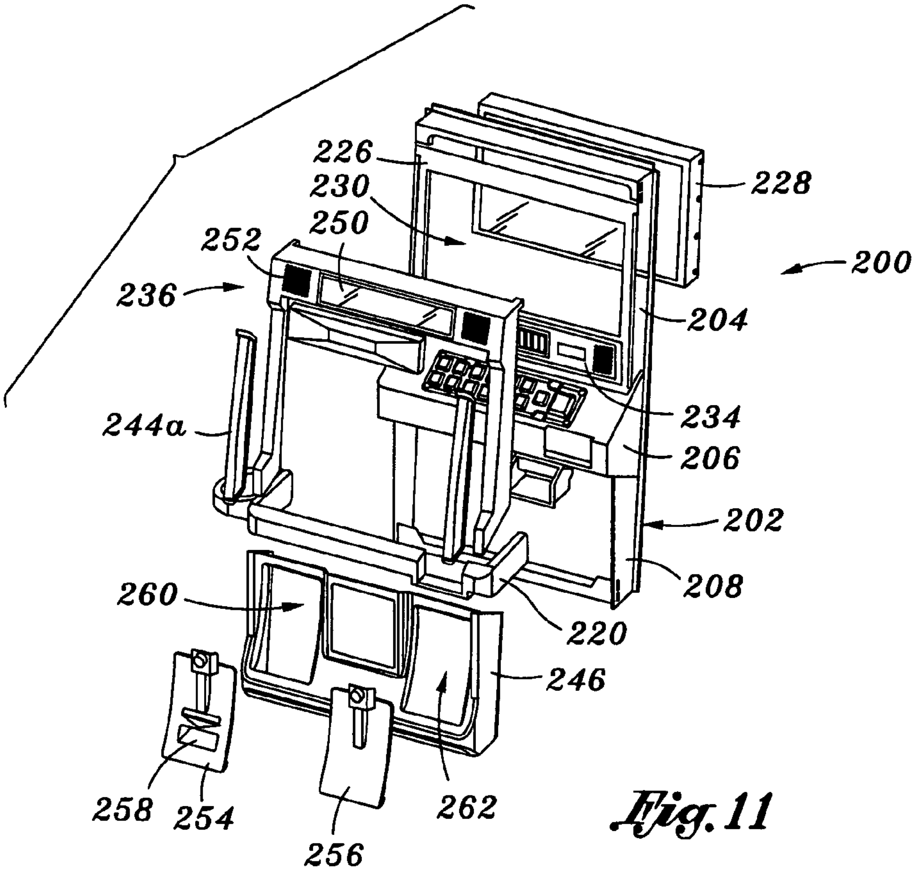
FIG. 11 is an exploded view of the door assembly in accordance with another embodiment of the invention.

FIG. 11 shows yet another configuration of a door assembly 200. In this embodiment, like reference numbers have been given to like elements to those of the embodiment illustrated in FIG. 9, for ease of reference.

Once again, the door assembly 200 includes a door frame 202. The door frame 202 is similar to that above, including an upper portion 204, a component panel 206 and a lower portion 206. Further, the door assembly 200 includes a bezel 226 which defines a display opening 230 for alignment with a display 228. As illustrated, the bezel 226 includes a component portion or panel 234.

The door assembly 200 also includes a bumper 220 mounted to the panel 206, as well as an upper frame cover 236 and a lower frame cover 246. Once again, inserts 244*a*,244*b* may be provided for mating with the upper frame cover 236.

In this configuration, one or more components are associated with the upper frame cover 236. As illustrated, one or more displays 250, speakers 252 or the like may be mounted to or supported by the upper frame assembly. As illustrated, these components are located in the top portion of the upper frame cover 236. They might be located in other areas.

FIG. 11 also illustrates another configuration of a lower frame cover 246. In this configuration, the lower frame cover 246 does not define a single main opening or display area. Instead, the lower frame cover 246 includes a first movable panel 254 and a second movable panel 256. These panels 254,256 may be movably connected to the lower frame cover 246 or otherwise be mounted to move relative to the door frame 202. These panels 254,256 may selectively control access through corresponding openings 260,262 in the lower frame cover 246.

In one embodiment, a locking mechanism may be provided for selectively locking each panel 254,256 into its closed position. The panels 254,256 may have a variety of sizes and shapes. As illustrated, at least one of the panels 254 might, for example, define a slot 258 through which tickets or other media or elements may be dispensed.

In accordance with a method of the invention, a gaming machine door may be assembled into a variety of configurations. In one embodiment, a support panel is connected to a door frame. The position of the support panel may be adjusted to define top and bottom portions of the door frame. A bezel is connected to the door frame along with upper and lower frame covers. The door may be connected to a housing of a gaming machine, such as via one or more hinges so as to rotate between open and closed positions.

In accordance with the invention, a gaming machine may advantageously have various configuration for a variety of purposes, while still having the same basic design and employing the same basic components, thus substantially lowering the cost of manufacture. For example, the same gaming machine might be configured for two different casinos. In a high end market, various components of the gaming machine/door might be plated with gold or a similar precious metal to give the machine an expensive appearance. In a lower end market, various of the components of the gaming machine/door may be molded from plastic or the like to keep the cost of the machine lower.

The same principles permit the gaming machine to be configured for different purposes. For example, the gaming machine might be configured for a traditional casino market, and thus have a traditional appearance. On the other hand, the machine might be configured to have an appearance of a lottery or arcade unit.

In a preferred embodiment, the electrically conductive paths which are defined between the components and to ground preferably have a lower resistance than other potential electrical paths. In this manner, an electric charge is most likely to follow the path defined through and/or between the components to ground, rather than other paths, such as via wiring to the gaming machine controller or the like.

In one embodiment, various components of the machine, such as a bill validator or the like, may be mounted to the door of the gaming machine using a metal bezel. Such a bezel may add to the rigidity or stiffness of the door, as well as provide an additional grounding path to the door (such as to the door frame). For example, the bill validator may be mounted to a bezel which is mounted to the back of the door frame.

In accordance with prior gaming machines, many components (such as bill validators, lights, and the like) were AC powered. These components were fairly insensitive to electric shock. However, in accordance with one embodiment of the invention, various of the components of the gaming machine may be DC powered. While these components have the advantage of using much less power, a problem has arisen that these components are much more sensitive to electric shock. In accordance with the present invention, the gaming machine is configured to prevent such shock from traveling to those components, solving this problem.

A variety of features of the invention will now be appreciated from FIGS. 8-11. These figures illustrate a door assembly which permits the configuration of a gaming machine or similar device to be customized. In particular, the appearance of the gaming machine may be changed by changing the configuration or appearance of the door including one or more of: (1) changing the location of the support panel (by moving the panel up or down, the areas above and below the support panel change sizes); (2) changing the bezel and associated components (to include one display, more than one display, a component area, such areas above or below the display(s), etc.); (3) changing the shape or appearance of the bumper; (4) changing the trim, color or other aesthetics of the door; (5) changing the one or more components located in the lower area (such as from a back-illuminated panel to a video display to a ticket printer, etc.).

In accordance with one aspect of the invention, a gaming machine door is configured to dissipate electricity/electrical shock. As is well known, players of gaming machines often transfer static electricity to a gaming machine when they touch the gaming machine. This electrical charge may flow through the circuitry of the gaming machine to various components thereof, damaging the components and/or causing malfunction thereof.

In accordance with the invention, the components of the door are configured to transmit any such electrical charges to ground, preventing them from damaging the gaming machine. As indicated above, the support panel, bezel, door frame and upper frame assembly are all preferably configured to transmit electricity. In this manner, any static or other electrical charges which are transferred by the player are transmitted through these components to ground, rather than through the circuitry of the machine. In particular, these components of the door are all connected to form an electrical pathway. Thus, for example, if the player touches one of the buttons on the button panel and an electrical charge is transmitted, it passes to the button panel and then the door frame and to ground.

Figure 14:
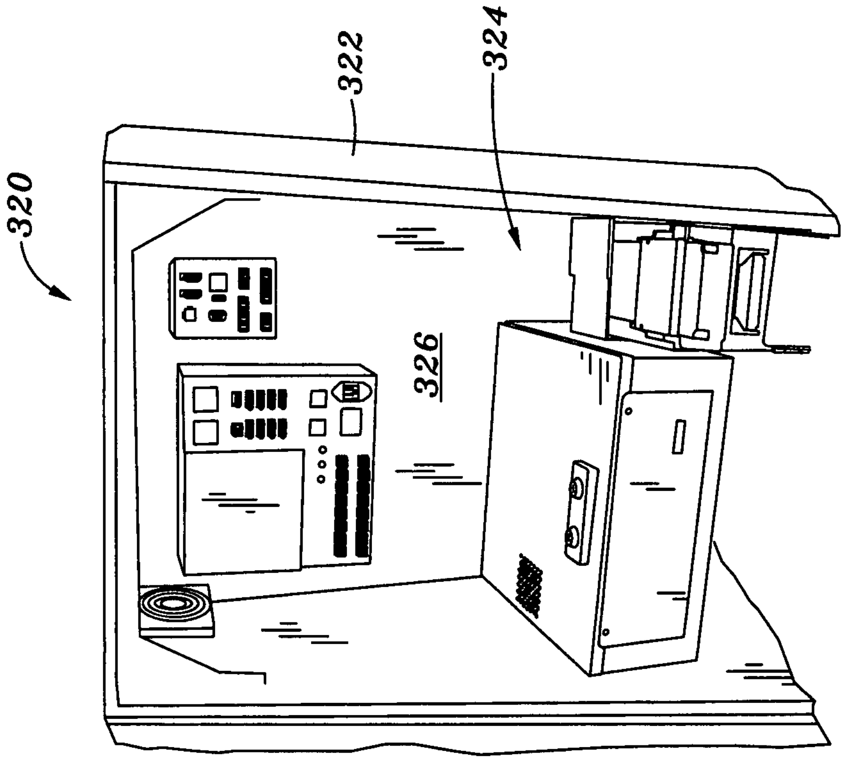
FIGS. 13 and 14 illustrate a component mounting configuration for a gaming machine in accordance with an embodiment of the present invention.
Figure 13:
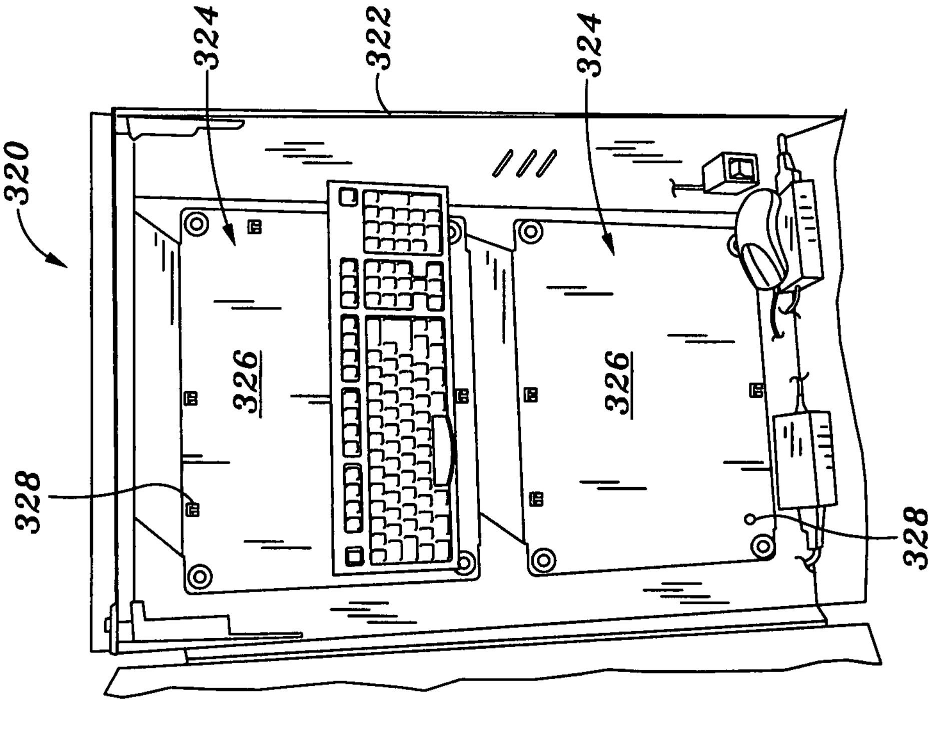

Various other aspects of the invention will now be described. Referring to FIGS. 13 and 14, one embodiment of the invention is an internal component mounting arrangement for a gaming machine. FIG. 13 illustrates a gaming machine 320 having a housing or cabinet 322. The housing 322 may be configured similar to that of the gaming machine 20 illustrated in FIG. 1, and may include one or more doors or other access panels to an interior thereof.

In a preferred embodiment, one or more component mounting panels 324 are located at the interior of the housing 322. In the embodiment illustrated, two mounting panels 324 are located a rear or back of the housing 322 at the interior thereof.

The mounting panel 324 preferably defines a generally planar mounting surface 326. In one embodiment, the mounting surface 326 of the panel 324 is offset or spaced outwardly from the rear of the housing 322. For example, in one embodiment, the panel 324 comprise a metal sheet having portions of one or more edges bent rearwardly, thus defining feet extending from the mounting surface 326, those feet when engaging the rear of the housing 322 off setting the mounting surface 326 from the housing 322. Of course, other means may be provided for spacing the mounting surface 326 from the housing 322, such as legs, spacers and the like.

The mounting panel 324 is connected to the housing 322. In one embodiment, this may be accomplished with fasteners. Welding or other means of connection may alternately be provided. Preferably, so connected to the housing 322, the mounting surface 326 of the panel 324 is generally vertically extending.

In one embodiment, a plurality of apertures 328 are provided in the mounting surface 326. The apertures 328 are configured to accept fasteners for mounting components of the gaming machine 320 thereto. The fasteners may comprise hooks, bolts or other elements. The fasteners may be separate from or integral with the gaming machine component(s).

FIG. 13 illustrates various components mounted to the two mounting panels 324. As illustrated, these components comprise a keyboard, among other things. The particular components which are mounted to the one or more mounting panels may vary. For example, FIG. 14 illustrates an embodiment where a gaming machine CPU or controller and various other components are mounted to a large panel 324.

This component mounting configuration has numerous advantages over current mounting configurations. Currently, shelves or racks are generally located in the gaming machine to provide horizontal support surfaces for components. These horizontal shelves and racks suffer from a number of drawbacks. First, the shelves dictate where components may be located. For example, depending upon the spacing between shelves, certain components may not fit between closely spaced shelves, but must be placed elsewhere. In addition, these shelves severely interfere with the flow of air through the gaming machine, making it more difficult to cool the components.

In accordance with the mounting configuration of the invention, components of the gaming machine may be mounted any where in the gaming machine. This allows the gaming machine to be customized for each particular application. For example, when considering the gaming machine configuration illustrated in FIGS. 1-7, displays and other devices may be associated with the door in a plurality of configurations. In accordance with the component mounting configuration, the supporting infrastructure of the gaming machine may be altered depending upon that gaming machine configuration. For example, the position of a CPU or controller of the device may be moved to accommodate a display, card reader or the like which is mounted to the door and extends into the gaming machine.

In addition, this mounting configuration permits the interior of the gaming machine to remain substantially open. This allows air to more freely flow through the gaming machine to cool the components. The configuration also promotes access to the components for replacement and repair.

Figure 15:
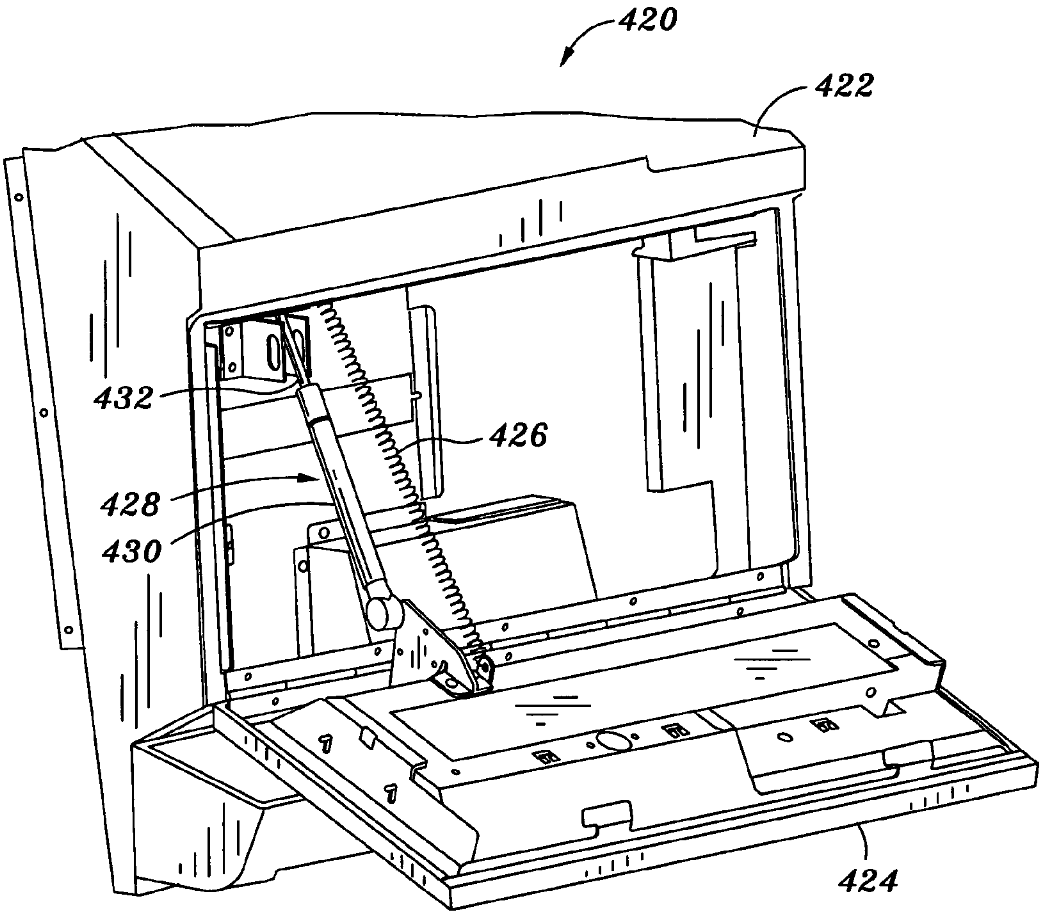
FIG. 15 illustrates a panel opening/closing biasing mechanism in accordance with an embodiment of the present invention.

Referring to FIG. 15, one embodiment of the invention is a biasing mechanism for a gaming machine door or panel which may be moved between open and closed positions. As illustrated, a gaming machine 420 has a door or access panel 424. The door or access panel 424 is preferably moveable between a first and second position. As mounted to a housing 422 of the gaming machine 420, the door or access panel 424 may selectively provide access to the interior of the housing 422. One such panel 30 is illustrated in the gaming machine 20 illustrated in FIG. 1.

In the embodiment illustrated, the access panel 424 is hingedly mounted to the housing 422. In a preferred embodiment, means are provided for controlling movement of the panel 424 to an open position and for controlling movement of the panel to its closed position. In one embodiment, these means comprise means for biasing the panel towards an open position and means for biasing the door towards a closed position.

In a preferred embodiment, a spring 426 is connected to the door panel 424 and another member, such as a the housing 422 which supports the panel 424. As illustrated, the spring 426 may be a coil-type spring having one end connected to the panel 424 and the other connected to the housing 422. Preferably, the spring 426 is configured to bias the panel 424 towards its closed position.

A piston 428 preferably biases the panel 424 towards its open position. In the embodiment illustrated, the piston 428 has a body 430 and an arm 432. Preferably, the arm 432 is biased outwardly towards an extended position. One end of the piston 428, such as at the arm 432, is connected to the housing 422 or other support. The other end of the piston 428, such as at the body 430, is connected to the panel 430.

Preferably, the biasing forces generated by the two biasing means (in this case the spring 426 and piston 428) are carefully selected so that: (1) when a user desires to move the panel 424 from a closed to the open position illustrated in FIG. 15, the user pulls the panel 424, the piston 428 aiding in moving the panel 424 towards the open position against the biasing force generated by the spring 426, the panel 424 once in its open position being retained in that position by the piston 428 against the biasing force generated by the spring 426; and (2) when a user desires to move the panel 424 from the open back to the closed position, the user moves the panel, the spring 426 biasing the panel 424 towards the closed position against the force of the piston 428.

So configured, a biasing force aids in moving the panel 424 in each direction of movement. At the same time, a biasing force is generated which opposes movement of the panel 424, thus preventing undesirable "slamming" of the panel 424 as it is moved back and forth. For example, when the panel 424 is opened, the spring 426 serves to reduce the speed at which the panel 424 may be opened, lessening the likelihood of the panel 424 slamming open and being damaged. Likewise, the piston 428 prevents slamming of the panel 424 as it is moved to its closed position, protecting the panel 424 and components of the gaming machine located there behind.

Of course, other means may be provided which accomplish the above-stated functions. For example, more than one spring may be used. Other means for biasing may also be utilized, such as elastic cords and bands and the like.

Figure 16:
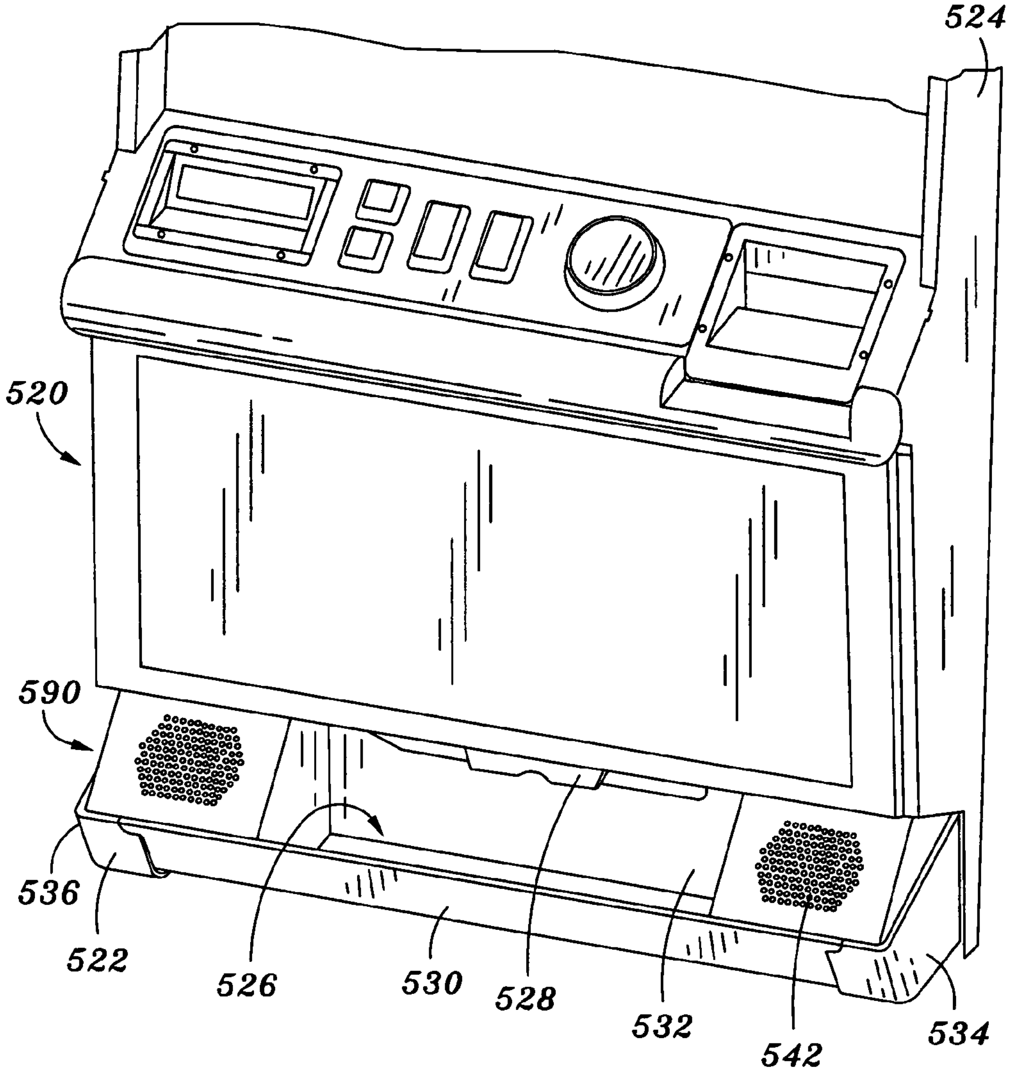
FIG. 16 illustrates a speaker mounting configuration of a gaming machine in accordance with an embodiment of the present invention.

One embodiment of the invention is a gaming machine including one or more sound-generating devices such as speakers. Referring to FIG. 16, a gaming machine 520 is illustrated. The gaming machine 520 may be similar to the gaming machine 20 illustrated in FIG. 1, or may have a wide variety of other configurations.

As illustrated, the gaming machine 520 includes a coin tray 522. In one embodiment, the coin tray 522 is mounted to a door 524 of the gaming machine 520. The coin tray 522 may be supported by a housing or other component of the machine 520, or by an external member.

As illustrated, the coin tray 522 defines a trough 526 into which coins, token or the like may be dispensed. In the embodiment illustrated, coins may be dispensed from a slot at the end of a coin delivery chute (not visible) leading from an interior portion of the gaming machine 520. In the embodiment illustrated, and applicable to other embodiments of gaming machines described herein, a media printer is configured to dispensed media, such as printed tickets or the like, through a dispenser 528 to the coin tray 522.

In one embodiment, the trough 526 is defined by a front wall 530 and a rear wall 532. Ends of the trough 526 may be closed with end members 534,536. In one embodiment, the end members 534,536 may be formed as separate elements from the front and/or rear walls 530,532.

In the embodiment illustrated, the trough 526 is elongate, and relatively shallow in depth and height. The trough 526 may have a variety of shapes, however. For example, the trough 526 may be relatively short, but have a greater depth (i.e. distance from front to rear wall) or height dimension. In this manner, the trough 526 may catch and hold a plurality of coins, tokens or the like dispensed into the tray 532.

In accordance with the present invention, one or more speakers 540 or other sound generating devices are located in the coin tray 522. Preferably, the speakers 540 are located within the trough 526 of the coin tray 522 and are configured to direct sound outwardly of the trough. In the embodiment illustrated, the speakers 540 include sound-generating devices (not visible) which are located in housings. Each housing has one or more apertures or grills 542 through which sound is directed.

In the preferred embodiment, the housings of the speakers 540 are configured to fit within the trough 526. The apertures/grills 542 through which sound is directed are oriented to direct sound towards a player of the gaming machine. In the embodiment illustrated, the gaming machine 520 is an "upright" type gaming machine where the coin tray 522 is located at the bottom of the machine 520. In this configuration, the coin tray 522 is generally located well below a player's head (and ears), whether the player is standing or sitting. As such, the speakers 540 are preferably configured to direct sound upwardly and outwardly of the trough. Of course, the speakers 540 might be oriented differently if they are located in a different position on the machine, and thus in a different location relative to the player.

The speakers 540 are preferably connected to the coin tray 522 or an associated structure, so that they are not removed by players or other parties.

In a preferred embodiment, the speakers 540 are located at opposing ends of the trough 526, such that they are separated from one another. The remaining space of the trough 526 between the speakers 540 provides an area for collection of dispensed coins/tokens/tickets (or other media).

It is noted that the speakers may be of a variety of types, such as small horn, diaphragm, electro-static or the like. Preferably, a signal is provided to the speakers 540, causing the speakers to generate sound. The signal may be generated or provided by a wide variety of devices, such as a small amplifier (not shown).

This arrangement has a number of advantages. First, the speakers 540 are located in the coin tray 522, and thus do not occupy any of the space within the gaming machine 520. This frees space within the gaming machine 520 for other components. In addition, the speakers then do not occupy any space in the main area of the gaming machine which is necessary for displays, buttons and the like.

In addition, the "trough" configuration of the coin bowl 522 acts as a sound-concentrating and directing device for the speakers 540, improving the sound quality and output level of the speakers. In particular, while much of the sound generated by the speakers 540 is directed outwardly, other sound waves are directed inwardly. In this case, those sound waves are reflected back outwardly. In addition, the spacing of the speakers 540 improves channel separation, thus improving the "stereo" effect when the speakers 540 generate sounds associated with different signals (such as left and right stereo signals).

Figure 17:
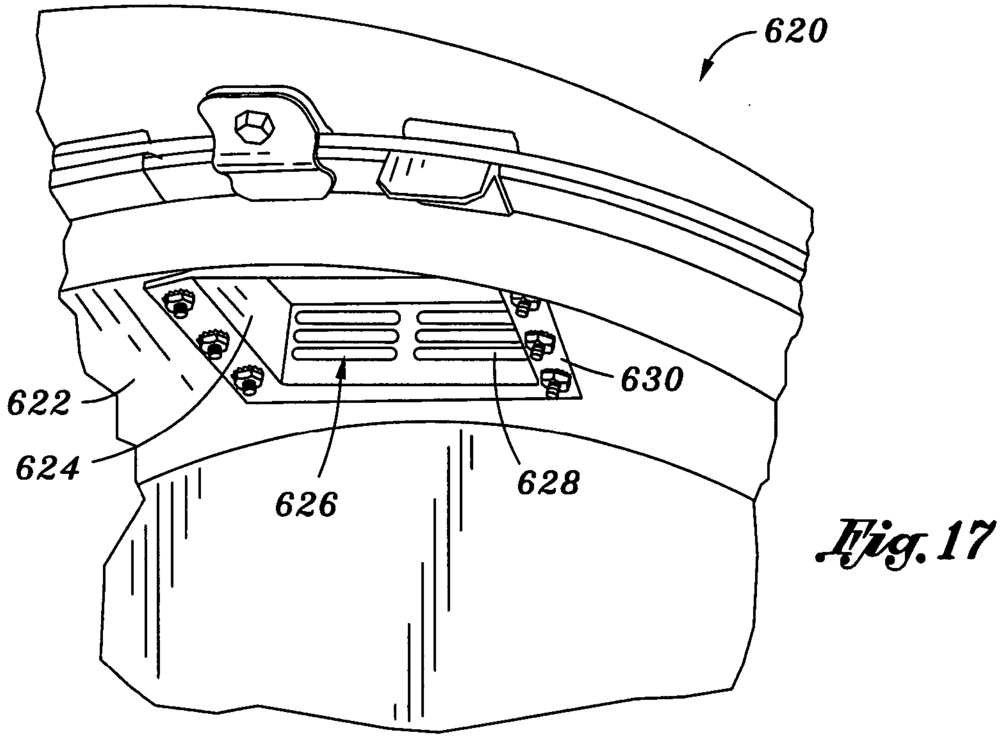
FIGS. 17-19 illustrate a gaming machine venting system in accordance with an embodiment of the present invention.

Another embodiment of the invention is a venting configuration for a gaming machine. Referring to FIG. 17, a gaming machine 620 includes a housing or cabinet 622. In one embodiment, the housing 622 has a top. In the embodiment illustrated, the top of the housing 622 is rounded. The housing may have other configurations, such as illustrated in FIG. 1 where the top of the housing is generally flat.

In accordance with the invention, means are provided for venting air from inside of the housing or cabinet 622 to a point exterior thereto, at a top of the housing. In a preferred embodiment, at least one opening or vent through which air may flow is provided at a top of the housing 622. The at least one opening or vent allows warm air within the housing 622 to flow to the exterior of the housing 622, for replacement by cooler air.

In a preferred embodiment, a light stand 624 is located at a top portion of the housing 622. In a preferred embodiment, the light stand 624 is located at the highest or top-most portion of the housing 622.

Figure 18:
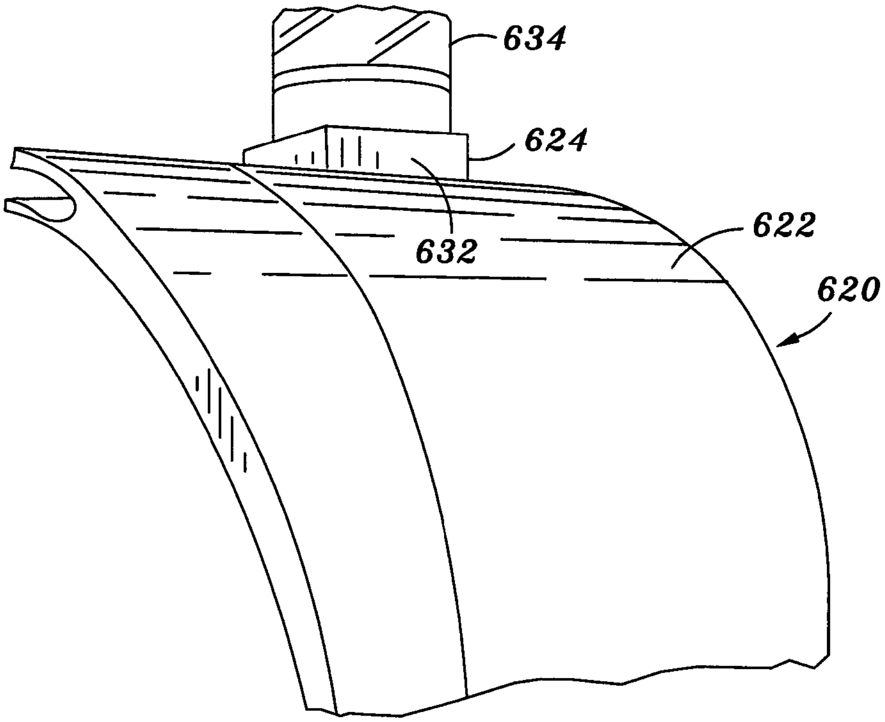

As illustrated in FIG. 18, the light stand 624 defines a flow path from the interior of the housing 622 to a point exterior thereto. Thus, in a preferred embodiment, an opening is provided in the housing 622. The stand 624 is connected to the housing 622 at the opening, the stand defining an air flow passage 626. The stand 624 includes one or more vents or openings 628 which extend to an exterior of the stand 624. The air flow passage 626 leads from the interior of the housing 622 to the one or more vents 628, which vents 628 then lead to a point exterior to the housing. In this manner, heated air is allowed to flow from within the housing 622 to a point exterior to the housing 622.

In one embodiment, the light stand 624 has a base portion 630 which connects to the housing 622. A riser portion 632 extends from the base portion 630. When the base portion 630 is connected to a housing 622, the riser portion 632 thus extends upwardly beyond the top of the gaming machine 620, as illustrated in FIG. 18.

The light stand 624 may have a variety of configurations. In the embodiment, the stand 624 has a generally square perimeter having four sides. As illustrated, the vents or openings 628 may be provided in a rear side (when viewing the front of the gaming machine). The vents 628 may have a variety of configuration. In one embodiment, the vents 628 may be elongate slots formed in a side of the stand 624.

The light stand 624 is preferably also utilized to support a gaming machine light 634. The light 634 may have variety of configurations. In one embodiment, the light 634 may be cylindrical in shape. The light 634 may be used to signal the need for service, such as in the event of machine malfunction or a jackpot award. As illustrated in FIG. 18, the light 634 may be mounted to the top of the stand 624 and extend upwardly therefrom.

In one embodiment, means may be providing for forcing air through the vents 628. A fan may be provided for directing air towards and through the vents 628 to a point exterior to the housing 622. In one embodiment, the fan may be mounted at the base portion 630 of the stand 624. The fan may be located in a housing which defines a flow path having an inlet and an outlet. The inlet may be in communication with the interior of the housing 622 and the outlet may be in direct communication (and preferably is sealed to) with the air passage 626 defined by the stand 624. The fan may be electrically powered and be configured to draw air from within the housing 622 and expel it under pressure or with force to the stand 624, and through the vents 628 thereof to the exterior of the housing.

Figure 19:
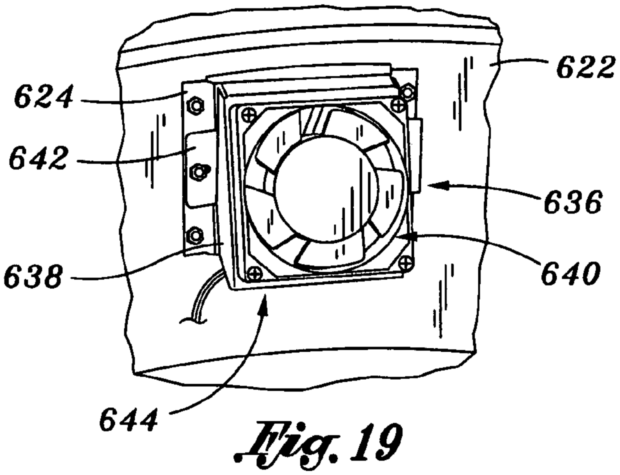

FIG. 19 illustrates a preferred embodiment of a venting configuration including a fan 636. As illustrated, the fan 636 is located inside of the housing 622 beneath the stand 624. In the preferred embodiment, a body 638 comprises a duct which defines a plenum or path 640 leading from the interior of the housing 622 to the air flow path 626 defined by the stand 624. As illustrated, the body or duct 638 has a top end 642 which defines one or more mounting elements or surfaces, such as the pair of outwardly extending flanges which are illustrated, for connecting the body or duct 638 to the housing 622 at the opening leading to the stand 624. The body 628 may be mounted to the housing 622 using one or more of the same fasteners which mount the stand 624 to the housing. A seal (not shown) may be located between the first or top end 642 of the body 638 and the adjacent surface of the stand 624 or housing 622 for sealing the flange thereto and reducing the leakage of air there between.

A main portion of the body 638 comprises a wall which extends from the top end 642 to an opposing second end 644. In one embodiment, the body 628 is generally square in cross-sectional shape (thus having four sides). The body 628 could have a variety of other shapes (such as circular or rectangular), however, and may have a variety of sizes/dimensions.

The fan 636 is mounted to the body 638. Preferably, the fan 636 is located at the second end 644 of the body 638 or within the plenum or air path 640 defined there through. In this manner, the fan 636 is configured to draw air from within the housing 622 and direct all of that air through the plenum 640 of the body 638 to the air flow path 626 defined by the stand 624. In a preferred embodiment, the fan 636 is a self-contained unit which includes a housing for a turbine/propeller (or other air moving element(s)), and a motor. The housing of the fan 636 may be connected to the body 628, such as with one or more fasteners, so as to be replaceable.

In one embodiment, one or more vents or openings may be provided for allowing fresh, cool air into the gaming machine to replace the air which is being expelled through the vents 628. In one embodiment, one or more vents are provided at a lower portion of the machine. In this manner, cool air enters at or near the bottom of the machine and is permitted to circulate around heated components to cool them. The then heated air rises towards the top of the machine via convection and/or flows to the low pressure area generated by the one or more fans.

In one embodiment, at least one vent or opening is provided near a coin tray of the machine. Referring to FIG. 16, the coin tray is preferably located near a bottom of the machine. In that embodiment, a portion of the gaming machine overhangs the coin tray. Preferably, one or more vents are provided in that portion of the gaming machine. In the particular configuration illustrated in FIG. 16, a door portion of the gaming machine overhangs the coin tray. Preferably, the one or more vents are provided in the door.

In one embodiment, the vent may comprise a plurality of apertures in a plate or similar member forming the overhang of the door/housing.

This location of the one or more vents has several additional advantages. First, air is drawn from the front of the machine, rather than the rear or side. In situations where the gaming machine is located back-to-back or side-to-side with other machines, this eliminates problems in drawing air or obtaining cool fresh air for venting. In addition, the location of the vent is not visible, thus not detracting from the appearance of the machine.

This aspect of the invention has additional utility when the gaming machine includes the component mounting configuration described above. As described, such a mounting configuration more readily facilitates flow of cooling air through the machine.

Another embodiment of the invention is a light enclosure for a backlight of a gaming machine. Commonly, glass or similar panels are mounted in the housing or door of a gaming machine, the panel printed with instructions or similar information. In order to make the information more visible, the panel is often illuminated from the back. A problem is that the bulb of these lights is generally inaccessible. In particular, the bulb is generally closed in an enclosure which is mounted behind the panel, the enclosure reflecting directed light towards the panel. In order to remove and replace a bulb, the enclosure may need to be removed entirely in order to access the bulb.

Figure 20:
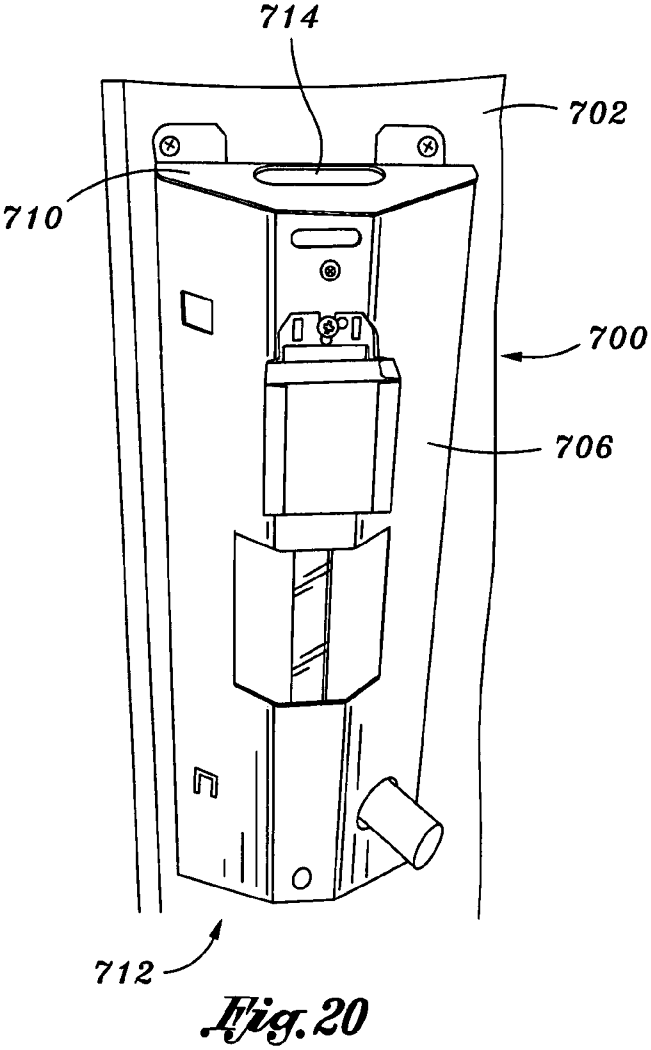
FIGS. 20 and 21 illustrate a light enclosure for a gaming machine backlight in accordance with an embodiment of the present invention.
Figure 21:
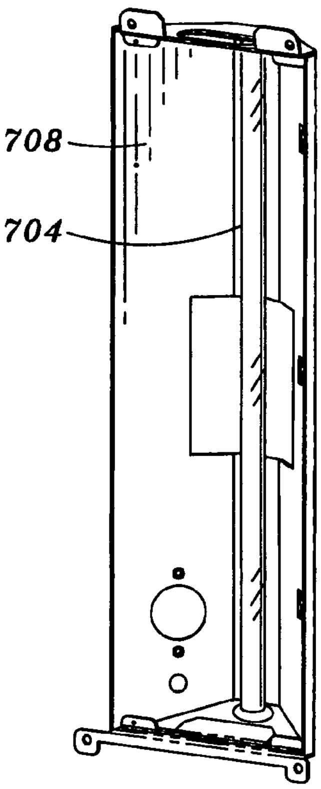

FIGS. 20 and 21 illustrated one embodiment of a light enclosure 700. In the embodiment illustrated, the light enclosure 700 is shown mounted to the inside of a gaming machine door 702, such as behind a panel which is to be illuminated. Of course, the enclosure 700 might be mounted to a housing or other support.

As illustrated, the light enclosure 700 is configured to accept one or more elongate bulb elements, such as an elongate flourescent tube 704. The particular shape and size of the light enclosure 700 may vary depending upon the particular light element which is to be enclosed.

The light enclosure 700 comprises a body 706 which defines a recessed area 708 for receiving the light element. In one embodiment, the body 706 has an inner surface and an outer surface. The enclosure 700 is configured to be mounted so that the inner surface reflects light generated by the light element forward, such as towards a panel.

As illustrated, the body 706 may define one or more mounting points for connecting the enclosure to a support, such as a door. These mounts may accept fasteners such as screws or bolts. Of course, other mounting means may be provided.

In one embodiment, one or more elements for powering the light element are associated with the enclosure. For example, a socket or sockets for accepting the light element, a ballast and/or other elements may be directly mounted to and supported by the enclosure 700. In other embodiment, one or more of those or other components may be separately mounted, and the enclosure may simply enclose the light element. In the preferred embodiment, a pair of sockets are provided for accepting the ends of the tube 504.

Preferably, the body 706 has a first end 710 and a second end 712. In one embodiment, an opening is provided in at least one of the ends. At illustrated, an access opening 714 is provided in the first end 710. The access opening 714 is preferably sized to permit access to and removal of the light element which is located in the enclosure 700 without removing the enclosure 700 from the door or other support. In the embodiment illustrated, the access opening 714 is sized to permit access to an end of the flourescent tube 704, and its removal from the enclosure 700.

Due to the location of the access opening at the first end 710, an end of the tube 704 is accessible and can be removed from its socket. The tube 704 can then be lifted out of the enclosure 700 through the access opening 714. A replacement bulb may be inserted into the enclosure in reverse. In this manner, a bulb or other light element may be replaced without having to remove the enclosure.

Figure 22:
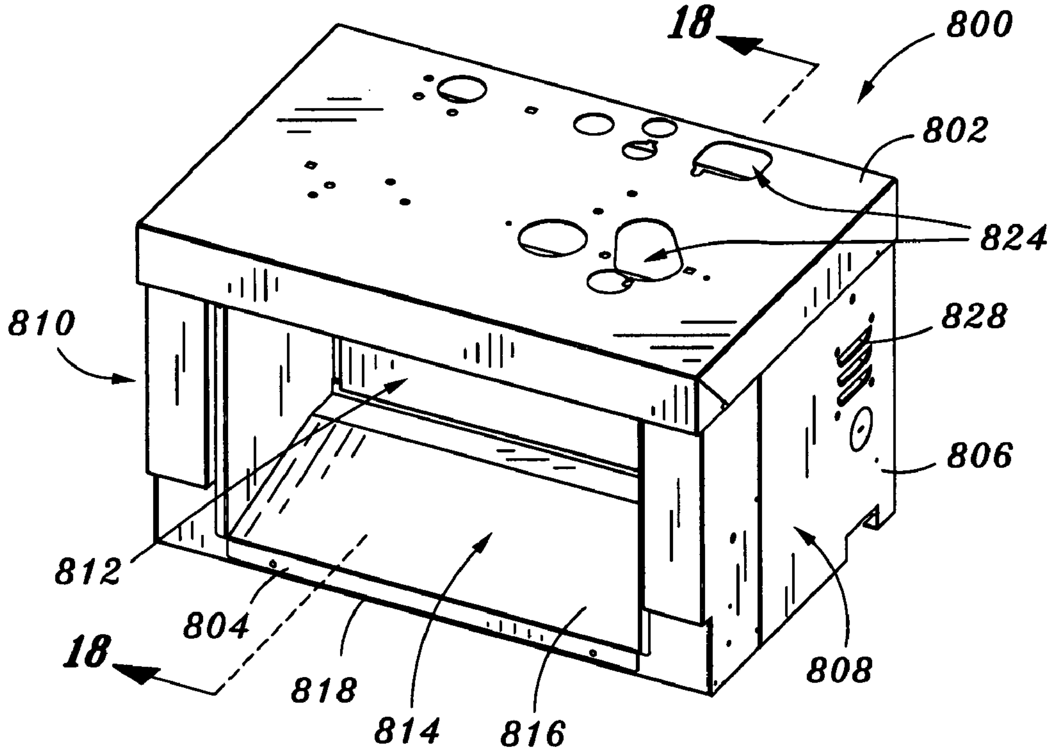
FIGS. 22 and 23 illustrate a gaming machine stand with integrated footrest in accordance with an embodiment of the present invention.
Figure 23:
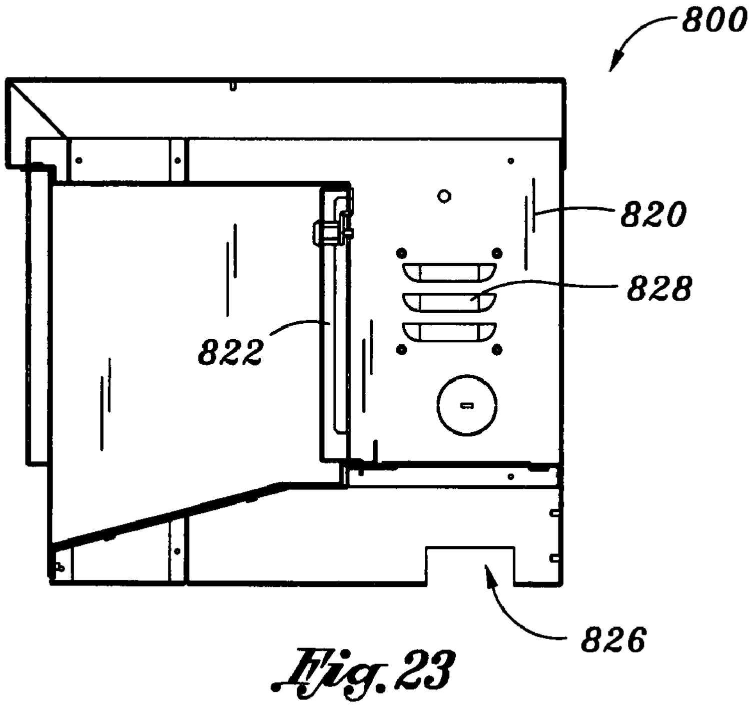

Yet another embodiment of the invention is a gaming machine stand with an integrated foot-rest area. FIGS. 22 and 23 illustrate one embodiment of the gaming machine stand 800. The stand 800 is preferably utilized to support a gaming machine. The gaming machine may be of a variety of types and of a variety of configurations. The gaming machine might be, for example, one such as illustrated in FIGS. 1-6 of the present invention.

As illustrated, the stand 800 includes a gaming machine support surface 802. The support surface 802 is elevated above a support surface by a base portion of the stand 800. In one embodiment, the base portion of the stand 800 comprises a bottom 804 and an upstanding wall 806.

In a preferred embodiment, the wall 806 forms three closed sides of the base portion, and one open side or open area. Thus, as illustrated, the wall 806 defines a first side 808, second side 810, and a back 812. A front 814 of the base portion is open between the first and second sides 808,810. The support surface 820 is located at the top of the wall 806, thus spaced from the bottom 804 of the stand 800.

The bottom 804 has a top surface 816 and a bottom surface 818. The bottom surface 818 is configured to contact a support surface. When the support surface is generally planar, the bottom surface 818 is preferably also generally planar.

Preferably, at least a portion of the top surface 816 is sloping. Referring to FIG. 22, the top surface 816 preferably slopes inwardly moving from the front 814 towards the back 812 of the base portion of the stand 800. The sloping top surface 816 of the bottom 804 of the stand 800 preferably defines a foot supporting surface. The exact angle or slop of the top surface 816 may vary but, as indicated, preferably slopes upwardly towards the back 812 of the stand 800.

In this configuration gaming stand 800, the bottom 804, support surface 802 and wall 806 define a cavity which is configured to accept a foot or both feet of a player of a gaming machine which is supported by the stand 800. It will be appreciated that the height of the support surface 802 above the top surface 816 of the bottom 804 of the stand 800 is preferably selected to provide sufficient clearance for the player's foot or feet.

As illustrated, the stand 800 may include various features relating to its support of a gaming machine. Of course, when a gaming machine is supported by the stand 800, the gaming machine is preferably oriented so that it faces towards the front of the stand (i.e. the side of the stand having the opening for accepting the player's feet).

In one embodiment, the stand 800 defines a storage area 820. Preferably, the storage area 820 is located at a rear of the stand 800, behind the foot/feet accepting opening. As illustrated, the storage area 820 is defined between the sides 808,810 at each side, by the back 812 at rear portion thereof, at the bottom by the bottom 804, at the top by the support surface 802, and at a front thereof by a panel 822.

In one embodiment, the panel 822 is mounted for movement relative to the stand 800. In one embodiment, the panel 822 is hingedly mounted to the stand 800 and movable between a raised, closed position and a lowered, open position. In the lowered position, access is preferably provided to the storage area 820 through the panel 822, as accessed through the open front 814 of the stand 800. The panel 822 may include a locking mechanism, such as a cam-type lock, which permits securing of the panel 822 into its closed position.

In one embodiment, openings or apertures 824 are provided in the support surface 802. One of more of these openings 824 preferably lead to the storage area 820. When a gaming machine is placed on the stand 800, power cords, communication cables and other equipment may be routed through the support surface 802 to the gaming machine from the storage area 820.

In one embodiment, the bottom 804 of the stand 800 may define at least one channel or passage 826. Elements such as power cords and communication cables may be routed through this channel 826. For example, a power cord may lead from a power source external to the stand 800 through the channel 826 to the storage area. So configured, the stand 800 serves as a conduit or routing member for cords and other elements connected to or leading to the gaming machine.

In one embodiment, components may be located in the storage area. For example, a processor, extra coin hopper or coin storage or other devices may be located in the storage area 820. In order to prevent excessive heat build-up from heat-generating components, one or more vents 828 may be provided. Preferably, these vents 828 lead to the storage area 820 to permit air flow exchange from the storage area 820 to a point external to the stand 800. As illustrated, the vents 828 may be located at either side 808,810 of the stand 800.

The stand 800 has numerous advantages. First, the stand 800 supports at least one gaming machine. Advantageously, the stand 800 also serves as a foot rest for a player of the game. Because the foot rest area is located within the stand 800, the player can sit closer to the machine. In addition, the combination of the stand the foot rest eliminates the need for a separate foot rest, such as are commonly provided on chairs which are located adjacent gaming machines. The stand 800 also defines a storage area and serves to hide and route gaming machine related components.

Of course, the stand 800 may have a variety of shapes and configurations, including sizes. For example, the stand 800 could be configured to support more than one gaming machine. For example, a stand might be similar to that illustrated in FIGS. 22-23 but have a generally symmetric portion at the back thereof, so as to support two gaming machines back-to-back, the stand defining two foot rest areas and at least one, if not two, storage areas. A stand might also be longer so as to accommodate two gaming machines (or more) in side-by-side relationship.

It will be appreciated that the various features of the invention may be utilized apart from the others, and may have a variety of applications. For example, the grounding configuration of the door may be applied to gaming machines having doors of other configurations. Similarly, the gaming machine support stand might be utilized with a wide variety of gaming device, whether such can be arranged into multiple configurations or not.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A door for a gaming machine permitting multiple configurations comprising:

a door frame, said door frame having a front and a rear, opposing sides and a top and a bottom and a central opening;

a support panel, said panel extending between said sides of said door frame, said support panel dividing said door frame and said central opening into a top portion and a bottom portion, the position of said support panel being changeable with respect to said door frame, whereby a size of said top and bottom portions may be varied;

a bezel connected to said door frame and located in said top portion, said bezel defining at least one opening through which a display device may be viewed;

an upper frame cover connected to said top portion of said door frame and located at said front thereof to define at least a portion of an exterior of said door; and a bottom frame cover connected to said bottom portion of said door frame and located at said front thereof to define at least a portion of an exterior of said door.

2. The door in accordance with claim 1 including a bumper connected to said support panel.

3. The door in accordance with claim 1 including a button panel connected to said support panel, said button panel supporting one or more user input devices.

4. The door in accordance with claim 1 wherein said bezel defines a first opening and a second opening.

5. The door in accordance with claim 4 further comprising a first video display supported by said door frame and viewable through said first opening of said bezel and a second video display supported by said door frame and viewable through said second opening of said bezel.

6. The door in accordance with claim 1 wherein said bottom frame cover defines an opening having a back-lit panel therein.

7. The door in accordance with claim 1 wherein an electrically conductive path is defined from said upper frame cover to said door frame, said bezel to said door frame, and said support panel and said door frame.

8. The door in accordance with claim 7 wherein said door frame and bezel are constructed of metal.

9. A method of configuring a door of a gaming machine comprising:

providing a door frame having a front and a rear, opposing sides and a top and a bottom and a central opening;

connecting a support panel at one of multiple possible positions between said top and bottom of said door frame, so that said support panel extends between said sides of said door frame and divides said door frame and said central opening into a top portion and a bottom portion;

connecting a bezel to said door frame at said top portion, said bezel defining at least one opening through which a display device may be viewed;

mounting an upper frame cover to said top portion of said door frame so that said upper frame cover defines at least a portion of an exterior of said door at said front of said door frame; and mounting a bottom frame cover to said bottom portion of said door frame so that said lower frame cover defines at least a portion of an exterior of said door at said front of said door frame.

10. The method in accordance with claim 9 including the step of mounting said bezel so that said at least one opening aligns with a display device.

11. The method in accordance with claim 9 including the step of mounting at least one video display to said door frame.

12. The method in accordance with claim 11 wherein said door frame has a front and a rear and said at least one display is mounted to said rear of said door frame.

13. The method in accordance with claim 9 wherein said door frame has a front and a rear and said bezel, upper frame cover and bottom frame cover are located at said front of said door frame.

14. The method in accordance with claim 9 including the step of defining an electrically conductive pathway from said upper frame cover to said door frame, said bezel to said door frame, and said support panel to said door frame.

15. The method in accordance with claim 9 including the step of mounting a bumper to said support panel.

16. The method in accordance with claim 9 including the step of connecting said door to a housing of a gaming machine.

17. A gaming machine permitting multiple configurations comprising:

a housing, said housing having an interior area and a front; and a door mounted to said housing and located at said front thereof, said door movable between a first open position and a second closed position, said door comprising:

a door frame, said door frame having a front and a rear, opposing sides and a top and a bottom and a central opening;

a support panel, said panel extending between said sides of said door frame, said support panel dividing said door frame and said central opening into a top portion and a bottom portion, the position of said support panel being changeable with respect to said door frame, whereby a size of said top and bottom portions may be varied;

a bezel connected to said door frame and located in said top portion, said bezel defining at least one opening through which a display device may be viewed;

an upper frame cover connected to said top portion of said door frame and located at said front thereof to define at least a portion of an exterior of said door; and a bottom frame cover connected to said bottom portion of said door frame and located at said front thereof to define at least a portion of an exterior of said door.

18. The gaming machine in accordance with claim 17 further comprising a display mounted to said door and viewable through said at least one opening defined by said bezel.

19. The gaming machine in accordance with claim 17 wherein said door is hingedly mounted to said housing and is generally vertically oriented.

20. The gaming machine in accordance with claim 17 further comprising a plurality of buttons and a bumper supported by said support panel.

* * * * *